United States Patent
Derryberry et al.

(10) Patent No.: US 12,547,320 B2
(45) Date of Patent: *Feb. 10, 2026

(54) CLOUD OBJECT STORAGE AND VERSIONING SYSTEM

(71) Applicant: Rubrik, Inc., Palo Alto, CA (US)

(72) Inventors: Jonathan Carlyle Derryberry, Union City, CA (US); Mohammad Bavarian, Palo Alto, CA (US); Sai Kiran Katuri, Santa Clara, CA (US); Sagar Kashinath Honnungar, Mountain View, CA (US); Harish Raman Shanker, Fremont, CA (US); Amelia Vu, Palo Alto, CA (US); Prateek Pandey, Santa Clara, CA (US); David Anthony Terei, San Francisco, CA (US); Vikas Jain, San Francisco, CA (US); Pradeep Madhavarapu, Palo Alto, CA (US)

(73) Assignee: Rubrik, Inc., Palo Alto, CA (US)

( * ) Notice: Subject to any disclaimer, the term of this patent is extended or adjusted under 35 U.S.C. 154(b) by 137 days.

This patent is subject to a terminal disclaimer.

(21) Appl. No.: 18/488,838

(22) Filed: Oct. 17, 2023

(65) Prior Publication Data

US 2024/0045598 A1  Feb. 8, 2024

Related U.S. Application Data

(63) Continuation of application No. 17/345,199, filed on Jun. 11, 2021, now Pat. No. 11,829,606.
(Continued)

(51) Int. Cl.
*G06F 3/06* (2006.01)
*G06F 11/07* (2006.01)

(52) U.S. Cl.
CPC .......... *G06F 3/0619* (2013.01); *G06F 3/0641* (2013.01); *G06F 3/0659* (2013.01); *G06F 3/067* (2013.01); *G06F 11/0772* (2013.01)

(58) Field of Classification Search
None
See application file for complete search history.

(56) References Cited

U.S. PATENT DOCUMENTS

| | | |
|---|---|---|
| 7,653,699 B1 | 1/2010 | Colgrove et al. |
| 9,098,432 B1 | 8/2015 | Bachu et al. |
| | (Continued) | |

OTHER PUBLICATIONS

Nguyen et al. (BFC: High-Performance Distributed Big-File Cloud Storage Based on Key-Value Store), pp. 1-6, ISBN: 978-1-4799-8676-7, Jun. 1-3, 2015.

*Primary Examiner* — Kaushikkumar M Patel
(74) *Attorney, Agent, or Firm* — Holland & Hart LLP

(57) ABSTRACT

Systems and methods for cloud object storage and versioning are provided. In an example, a cloud object storage and versioning system (COSVS) coordinates insertion of metadata into a database and data into an object store in a compute infrastructure, the compute infrastructure including the database, the object store, a data source, and a client application interacting with the data source. The COSVS has an architecture comprising a client API layer confined to provide an interface to the client application to facilitate storing or restoring of items originally obtained from the data source, and query different versions of item content originally obtained from the data source; a deduplication layer to deduplicate item content and store items originally obtained from the data source devoid of external item metadata or semantic relations among items; and a packing layer confined to store and retrieve bytes of item or object content.

18 Claims, 7 Drawing Sheets

Related U.S. Application Data

(60) Provisional application No. 63/038,725, filed on Jun. 12, 2020.

(56) References Cited

U.S. PATENT DOCUMENTS

| | | | |
|---|---|---|---|
| 9,569,357 B1* | 2/2017 | Shalev | G06F 3/0641 |
| 9,870,168 B1* | 1/2018 | Bent | G06F 3/0647 |
| 10,911,540 B1 | 2/2021 | Gunasekaran et al. | |
| 11,119,996 B2* | 9/2021 | Gold | G06F 16/2255 |
| 2012/0166448 A1* | 6/2012 | Li | G06F 16/11 |
| | | | 707/747 |
| 2014/0013112 A1* | 1/2014 | Cidon | G06F 16/182 |
| | | | 713/165 |
| 2015/0154221 A1* | 6/2015 | Shin | G06F 16/1752 |
| | | | 707/692 |
| 2016/0019148 A1* | 1/2016 | Vekiarides | G06F 12/0804 |
| | | | 711/122 |
| 2019/0129972 A1 | 5/2019 | Borate et al. | |
| 2020/0174934 A1* | 6/2020 | Zaydman | G06F 16/9014 |
| 2020/0327015 A1 | 10/2020 | Vargas et al. | |
| 2020/0341638 A1 | 10/2020 | Anand et al. | |
| 2021/0286535 A1 | 9/2021 | Aldred et al. | |
| 2021/0349788 A1 | 11/2021 | Brunzema et al. | |

* cited by examiner

CLOUD OBJECT STORAGE AND VERSIONING SYSTEM

CROSS REFERENCE

The present application for patent is a Continuation of U.S. patent application Ser. No. 17/345,199 by DERRYBERRY et al., entitled "CLOUD OBJECT STORAGE AND VERSIONING SYSTEM" and filed Jun. 11, 2021, which claims the benefit of U.S. Provisional Patent Application No. 63/038,725 by DERRYBERRY et al., entitled "CLOUD OBJECT STORAGE AND VERSIONING SYSTEM" and filed Jun. 12, 2020, each of which is assigned to the assignee hereof, and each of which is expressly incorporated by reference herein.

TECHNICAL FIELD

The present disclosure generally relates to special-purpose machines that manage database processes and improvements to such variants, and to the technologies by which such special-purpose machines become improved compared to other special-purpose machines for performing data deduplication.

More specifically, some examples relate to cloud object storage and versioning methods and systems.

BACKGROUND

Enterprise resource planning (ERP) systems, customer resource management (CRM) systems, and other production systems require repeated recovery, testing, and analysis. Accordingly, such systems are frequently backed up. But frequent backup of production systems may take a prohibitive amount of time and/or burden the system with processes that compete for scarce resources.

Data duplication is a computational task for eliminating duplicate copies of repeating data in a data storage system. For example, a storage device may store two volumes, where each volume shares some of the same data. To save storage space and decrease computational overhead, the two volumes can be deduplicated by replacing deduplicate data items in one of the volumes with pointers or references to the location of the duplicate data in the other volume. While deduplicating decreases storage space, the processes of deduplicating the data can be computationally intensive and may not perform well if the data to be deduplicated is very large or if resource-limited devices, such as hardware having a small amount of memory, are used to perform deduplication.

For data replication over a Wide Area Network (WAN) or to the cloud, bandwidth utilization is an important constraint, and it can be an advantage to minimize the amount of data that is required to be transferred.

SUMMARY

In some examples, a cloud object storage and versioning system (COSVS) coordinates insertion of metadata into a database and data into an object store in a compute infrastructure, the compute infrastructure including the database, the object store, a data source, and a client application interacting with the data source, the COSVS having an architecture comprising: a client API layer confined to provide an interface to the client application to facilitate storing or restoring of items originally obtained from the data source, and query different versions of item content originally obtained from the data source; a deduplication layer to deduplicate item content and store items originally obtained from the data source devoid of external item metadata or semantic relations among items; and a packing layer confined to store and retrieve bytes of item or object content.

In some examples, the deduplication layer acts as a key-value store for the client API layer, and wherein the keys in the key-value store have no semantic meaning externally of the COSVS.

In some examples, each key of the keys includes a universally unique identifier (UUID).

In some examples, the packing layer provides an interface for the key-value store, and wherein the keys are constructed and assigned a meaning internally of the COSVS by a concatenation of content hashes from the deduplication layer.

In some examples, the packing layer stores bytes of item or object content in packs, the packs based on a threshold item or object size, wherein items or objects below the threshold size are packed together in a single pack, and wherein an item or object above a threshold size is assigned a single key-value pair.

In some examples, the COSVS further comprises an intent logger to provide rollback functionality in the event of a malware event or system crash of the compute infrastructure.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1A:
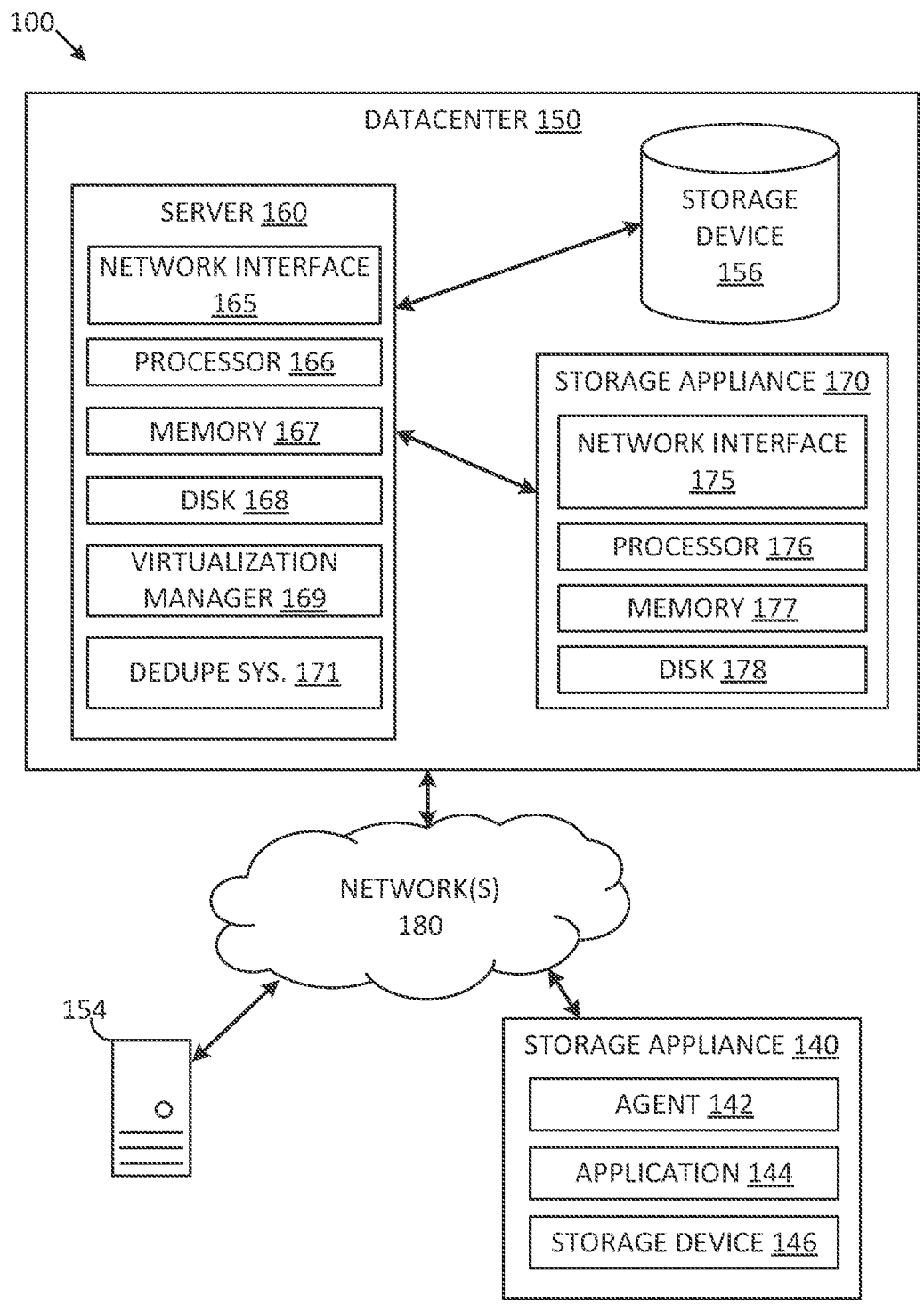
FIG. 1A depicts a networked computing environment in which the disclosed technology may be practiced, according to some example embodiments.

FIG. 1A depicts one embodiment of a networked computing environment 100 in which the disclosed technology may be practiced. As depicted, the networked computing environment 100 includes a datacenter 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment 100 may include other computing devices and/or other storage devices not shown. The other computing devices may include, for example, a mobile computing device, a non-mobile computing device, a server, a work station, a laptop computer, a tablet computer, a desktop computer, or an information processing system. The other storage devices may include, for example, a storage area network storage device, a networked-attached storage device, a hard disk drive, a solid-state drive, or a data storage system.

The datacenter 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the datacenter 150 to each other. The storage appliance 170 may include a data management system for backing up virtual machines and/or files within a virtualized infrastructure. The server 160 may be used to create and manage one or more virtual machines associated with a virtualized infrastructure. In some embodiments, the setup of the networked computing environment 100 is agnostic to datacenter 150 from the point of view of data source.

The one or more virtual machines may run various applications, such as a database application or a web server (e.g., a web server hosting an auto-parts website). The storage device 156 may include one or more hardware storage devices for storing data, such as a hard disk drive (HDD), a magnetic tape drive, a solid-state drive (SSD), a storage area network (SAN) storage device, or a networked attached storage (NAS) device. In some cases, a data center, such as datacenter 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 180 may include a secure network such as an enterprise private network, an unsecured network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

A server, such as server 160, may allow a client to download information or files (e.g., executable, text, application, audio, image, or video files) from the server 160 or to perform a search query related to particular information stored on the server 160 (e.g., in some cases, a server may act as an application server or a file server). In general, a server may refer to a hardware device that acts as the host in a client-server relationship or a software process that shares a resource with or performs work for one or more clients. In some embodiments, information or files may be accessed and queried from cloud services as data sources, instead of a server 160.

One embodiment of server 160 includes a network interface 165, processor 166, memory 167, disk 168, virtualization manager 169, and a deduplication system 171 all in communication with each other. Network interface 165 allows server 160 to connect to one or more networks 180. Network interface 165 may include a wireless network interface and/or a wired network interface. Processor 166 allows server 160 to execute computer-readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. The virtualization manager 169 may manage the provisioning of virtual machines running within the virtualized infrastructure and provide an interface to computing devices interacting with the virtualized infrastructure. In one example, the virtualization manager 169 may set a virtual machine into a frozen state in response to a snapshot request made via an application programming interface (API) by a storage appliance (e.g., agent installed on the storage appliance), such as storage appliance 140 or storage appliance 170. Setting the virtual machine into a frozen state may allow a point-in-time snapshot of the virtual machine to be stored or transferred. In one example, updates made to a virtual machine that has been set into a frozen state may be written to a separate file (e.g., an update file) while the virtual machine may be set into a read-only state to prevent modifications to the virtual disk file while the virtual machine is in the frozen state.

The virtualization manager 169 may then transfer data associated with the virtual machine (e.g., an image of the virtual machine or a portion of the image of the virtual disk file associated with the state of the virtual disk at a point in time it is frozen) to a storage appliance in response to a request made by the storage appliance. After the data associated with the point-in-time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 169 may perform various virtual-machine-related tasks, such as cloning virtual machines, creating new virtual machines, monitoring the state of virtual machines, moving virtual machines between physical hosts for load balancing purposes, and facilitating backups of virtual machines. In some embodiments, during the client backup application, there is no frozen state of the virtual machines.

The deduplication system 171 is configured to implement efficient deduplication approaches. Although the deduplication system 171 is illustrated as operating on the server 160, it is appreciated that the deduplication system 171 can be integrated and run on other devices of the networked computing environment 100, including, for example, on storage appliance 140 or storage appliance 170.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer-readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point-in-time versions of 1000 virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure as-a-Service (IaaS) services. SaaS may refer to a software distribution model in which applications are hosted by a service provider and made available to end-users over the Internet. In one embodiment, the networked computing environment 100 may include a virtualized infrastructure that provides software, data processing, and/or data storage services to end-users accessing the services via the networked computing environment 100. In one example, networked computing environment 100 may provide cloud-based work productivity or business-related applications to a computing device, such as computing device 154.

The storage appliance 140 may comprise a cloud-based data management system for backing up virtual machines and/or files within a virtualized infrastructure, such as virtual machines running on server 160 or files stored on server 160 (e.g., locally stored files, files stored in mounted directories), according to some example embodiments.

In some cases, networked computing environment 100 may provide remote access to secure applications and files stored within datacenter 150 from a remote computing device, such as computing device 154. The datacenter 150 may use an access control application to manage remote access to protected resources, such as protected applications, databases, or files located within the datacenter 150. To facilitate remote access to secure applications and files, a secure network connection may be established using a virtual private network (VPN). A VPN connection may allow a remote computing device, such as computing device 154, to securely access data from a private network (e.g., from a company file server or mail server) using an unsecured public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 170 may manage the extraction and storage of virtual machine snapshots associated with different point-in-time versions of one or more virtual machines running within the datacenter 150. A snapshot of a virtual machine may correspond with a state of the virtual machine at a particular point in time. In response to a restore command from the server 160, the storage appliance 170 may restore a point-in-time version of a virtual machine or restore point-in-time versions of one or more files located on the virtual machine and transmit the restored data to the server 160. In response to a mount command from the server 160, the storage appliance 170 may allow a point-in-time version of a virtual machine to be mounted and allow the server 160 to read and/or modify data associated with the point-in-time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point-in-time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end-user of the storage appliance 170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 170 may run an NFS server and make the particular version (or a copy of the particular version) of the virtual machine accessible for reading and/or writing. A user (e.g., database administrator) of the storage appliance 170 may then select the particular version to be mounted and run an application (e.g., a data analytics application) using the mounted version of the virtual machine. In another example, the particular version may be mounted as an iSCSI target.

In some example embodiments, the storage appliance 140 is an external network connected database appliance comprising an agent 142, an application 144, and a storage device 146. In some example embodiments, the application 144 is a database application for managing a database (e.g., Oracle database management system) that can store database data locally on storage device 146, or on remote storage locations, such as within datacenter 150. The agent 142 is a remote connection system for performing snapshots of database data (e.g., databases managed by application 144), and can further implement bootstrapping, upgrade, and further include backup features to transfer data from the storage appliance 140 to datacenter 150 via networks 180.

In some example embodiments, the agent 142 can be uploaded from the datacenter 150 and installed on the storage appliance 140. After installation on storage application 140, the agent 142 can be enabled or disabled by the storage appliance 140 over time. The agent 142 may acquire one or more electronic files or snapshot information associated with the one or more electronic files from the application 144. The snapshot information may include full and/or differential snapshot data. In one example, the one or more electronic files may comprise a database file for a database and the snapshot information may comprise a differential backup of the database file. In some embodiments, a set of APIs of an application allow client application to query the state of the virtual machines.

In those embodiments in which the application 144 is a database application that manages a database, the agent 142 is configured to acquire one or more electronic files corresponding with a first point-in-time version of the database from the database application. The agent 142 can further acquire a database file for the database from the application 144 or acquire a full or differential backup of the database from the computing application 144. The determination of whether the agent 142 acquires the database file or the full or differential backup may depend on a file size of the database file. The database file may comprise a text file or a binary file. The agent 142 may transfer one or more changed data blocks corresponding with the first point-in-time version of the database to the storage appliance 140. The one or more changed data blocks may be identified by the agent 142 by generating and comparing fingerprints or signatures for data blocks of the database file with previously generated fingerprints or signatures associated with earlier point-in-time versions of the database file captured prior to the first point in time. In some example embodiments, the agent 142 can perform automatic upgrades or downgrades to be in-sync with software changes to a plurality of nodes (e.g., nodes operating within storage appliance 170).

In some example embodiments, the agent 142 is further configured to interface with application 144 or storage device 146 to implement changes, such as creating directories, database instances, reads/writes, and other operations to provide database management functions between the storage appliance 140 and devices within datacenter 150. For example, the application 144 can be a relational database management application with plugin functionality, in which third-party developed plugins or extensions can be integrated in the application 144 to perform actions, such as the creation of a database instance.

Figure 1B:
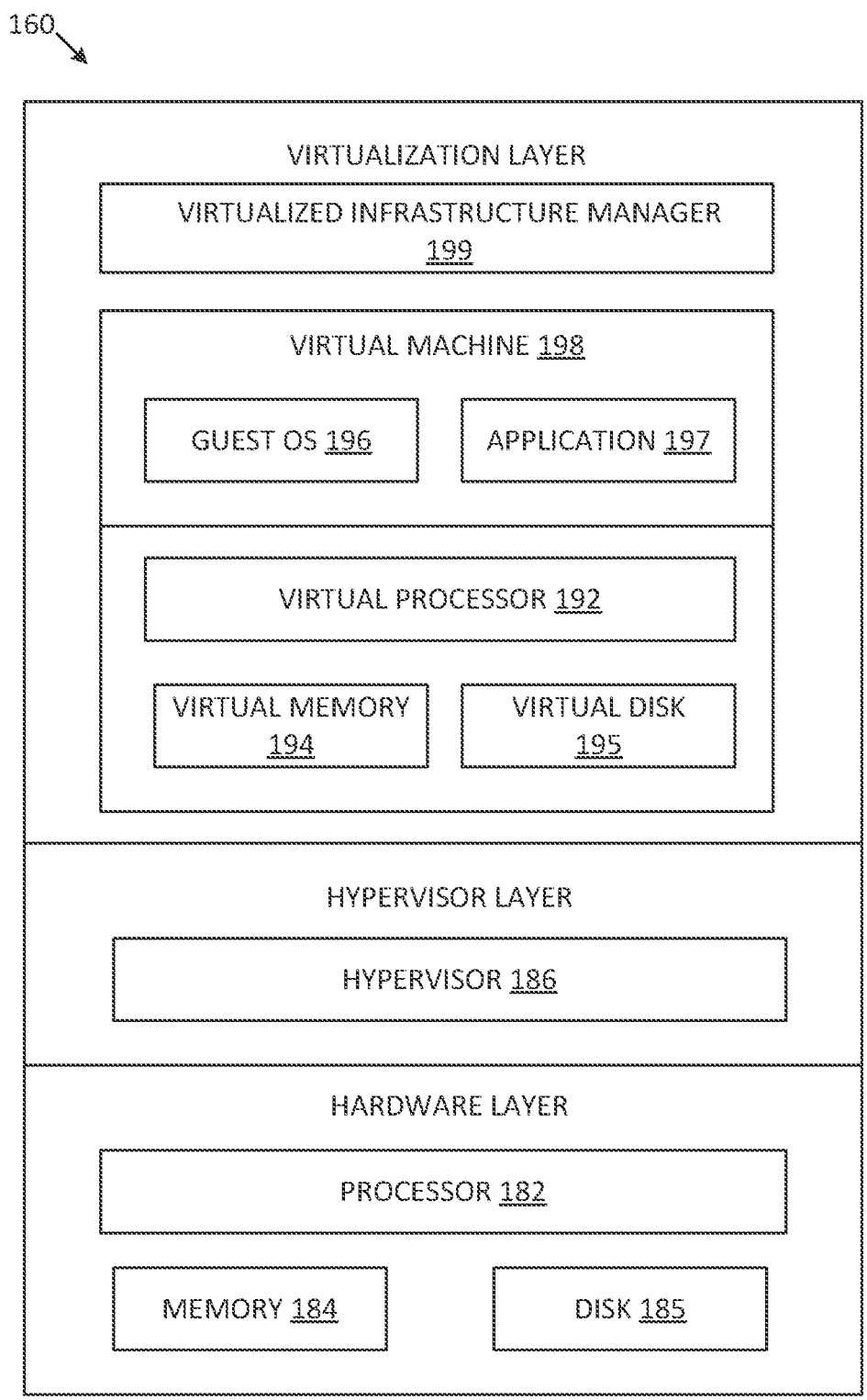
FIG. 1B depicts a server of a networked computing environment, according to some example embodiments.

FIG. 1B depicts one embodiment of the server 160 of FIG. 1A. The server 160 may comprise one server out of a plurality of servers that are networked together within a datacenter (e.g., the datacenter 150). In one example, the plurality of servers may be positioned within one or more server racks within the datacenter 150. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197.

The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines. The virtualized infrastructure manager 199 may manage the provisioning of virtual machines running within the virtualized infrastructure and provide an interface to computing devices interacting with the virtualized infrastructure. The virtualized infrastructure manager 199 may perform various virtualized infrastructure-related tasks, such as cloning virtual machines, creating new virtual machines (e.g., new virtual machines for new nodes of the cluster), monitoring the state of virtual machines, and facilitating backups of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with virtual blocks stored on a virtual disk of the virtual machine that has changed since the last snapshot of the virtual machine was taken. In one embodiment, the data management application may specify a first point in time and a second point in time and the virtualized infrastructure manager 199 may output one or more virtual data blocks associated with the virtual machine that have been modified between the first point in time and the second point in time. In some embodiments, during a request of a generation of a full snapshot or an incremental file associated with a snapshot, the querying entity may receive a history of operations spanning an interval of time.

In some embodiments, the server 160 or the hypervisor 186 may communicate with a storage appliance, such as storage appliance 140 in FIG. 1A or storage appliance 170 in FIG. 1A, using a distributed file system protocol such as Network File System (NFS) Version 3. The distributed file system protocol may allow the server 160 or the hypervisor 186 to access, read, write, or modify files stored on the storage appliance as if the files were locally stored on the server 160. The distributed file system protocol may allow the server 160 or the hypervisor 186 to mount a directory or a portion of a file system located within the storage appliance 140. For example, the storage appliance 140 can include a standalone host of a database, where the server 160 mounts the database directories as if the files were locally stored on server 160. Further, the server 160 may function as a backup device for storage appliance 140 by backing up data in the mounted directories in a distributed database within datacenter 150, such as a cluster of nodes in storage appliance 170.

Figure 1C:
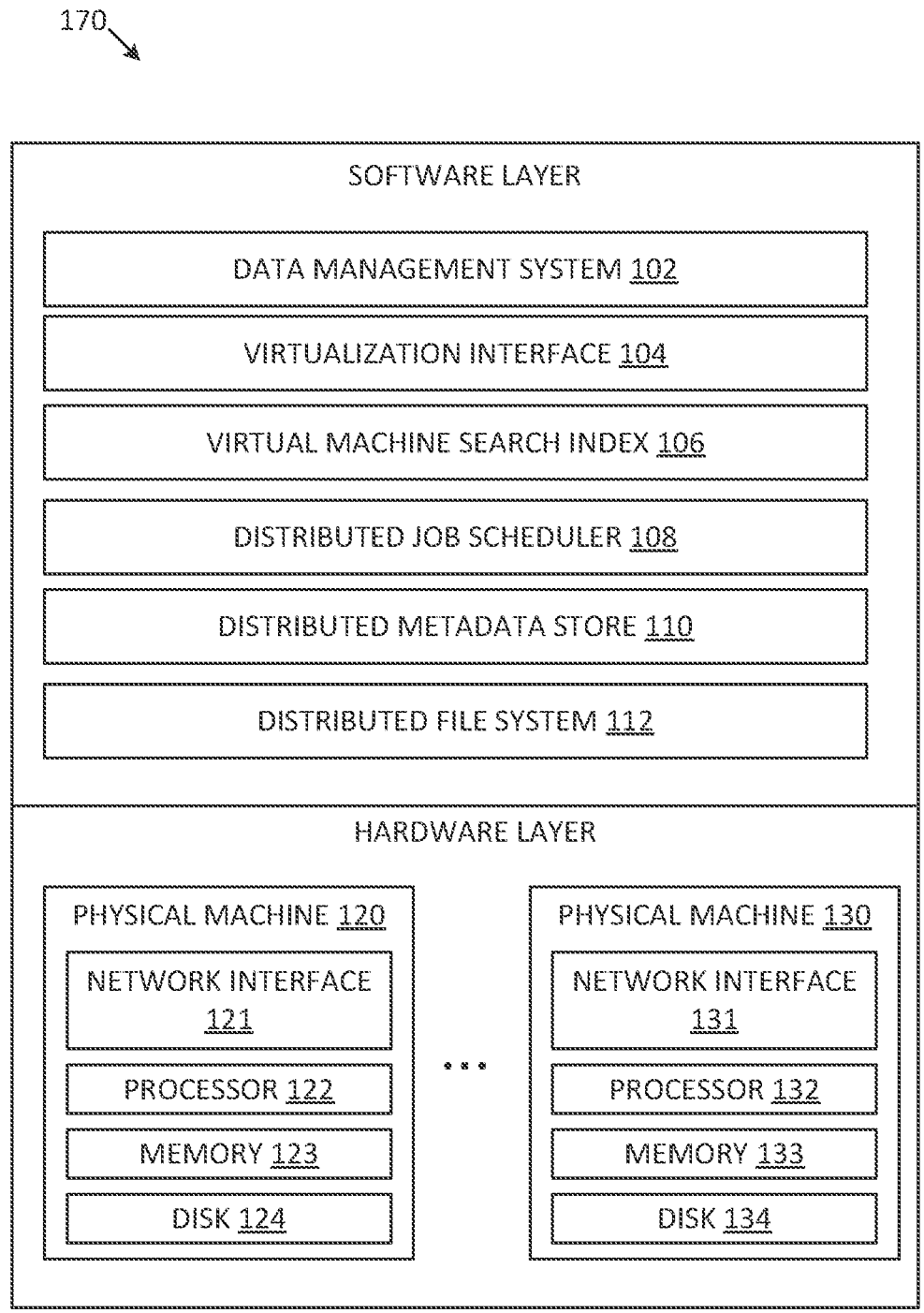
FIG. 1C depicts a storage appliance of a networked computing environment, according to some example embodiments.

FIG. 1C depicts one embodiment of storage appliance 170 in FIG. 1A. The storage appliance 170 may include a plurality of physical machines that may be grouped together and presented as a single computing system. Each physical machine of the plurality of physical machines may comprise a node in a cluster (e.g., a failover cluster, a Cassandra cluster). In one example, the storage appliance 170 may be positioned within a server rack within a datacenter. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer-readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer-readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., four machines in a cluster). Each of the plurality of physical machines may include a plurality of multi-core CPUs, 128 GB of RAM, a 500 GB SSD, four 4 TB HDDs, and a network interface controller.

In some embodiments, the plurality of physical machines may be used to implement a cluster-based network file server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 160 in FIG. 1A, or a hypervisor, such as hypervisor 186 in FIG. 1B, to communicate with the storage appliance 170 may not provide a failover mechanism (e.g., NFS Version 3). In the case that no failover mechanism is provided on the client side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 186 in FIG. 1B, may be configured with a first floating IP address associated with a first node in the cluster. The hypervisor 186 may connect to the cluster using the first floating IP address. In one example, the hypervisor 186 may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor 186 for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of nodeG) may be G-i) modulo N. In another example, given a number (N) of nodes in a cluster from node(0) to node(N−1), for a floating IP address (i), the VRRP priority of nodeG) may be (i-j) modulo N. In these cases, nodeG) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider). In another embodiment, the software-level components of the storage appliance 170 may run in a container or a serverless function, and may depend on database and blob storage that may be provided as SaaS.

In some cases, the data storage across a plurality of nodes in a cluster (e.g., the data storage available from the one or more physical machines) may be aggregated and made available over a single file system namespace (e.g., /snap-50 shots/). A directory for each virtual machine protected using the storage appliance 170 may be created (e.g., the directory for Virtual Machine A may be/snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 112 may present itself as a single file system, in which as new physical machines or nodes are added to the storage appliance 170, the cluster may automatically discover the additional nodes and automatically increase the available capacity of the file system 112 for storing files and other data. Each file stored in the distributed file system 112 may be partitioned into one or more chunks or shards. Each of the one or more chunks may be stored within the distributed file system 112 as a separate file. The files stored within the distributed file system 112 may be replicated or mirrored over a plurality of physical machines, thereby creating a load-balanced and fault-tolerant distributed file system 112. In one example, storage appliance 170 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 110 may include a distributed database management system that provides high availability without a single point of failure. In one embodiment, the distributed metadata store 110 may comprise a database, such as a distributed document-oriented database. The distributed metadata store 110 may be used as a distributed key value storage system. In one example, the distributed metadata store 110 may comprise a distributed NoSQL key-value store database. In some cases, the distributed metadata store 110 may include a partitioned row store, in which rows are organized into tables or other collections of related data held within a structured format within the key-value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., an HDD) and the one or more incrementals derived from the single full image snapshot may be stored using a second storage device of a second type (e.g., an SSD). In this case, only a single full image needs to be stored, and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals.

The distributed job scheduler 108 may be used for scheduling backup jobs that acquire and store virtual machine snapshots for one or more virtual machines over time. The distributed job scheduler 108 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 108 may schedule a specific job to be run on a particular node based on data stored on the particular node. For example, the distributed job scheduler 108 may schedule a virtual machine snapshot job to be run on a node in a cluster that is used to store snapshots of the virtual machine in order to reduce network congestion.

The distributed job scheduler 108 may comprise a distributed fault-tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster. In one example, the distributed job scheduler 108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 108 may undo and restart the failed jobs on available nodes within the cluster. In some embodiments, distributed job scheduler 108 may be a cloud-deployed service rather than being embedded in the cluster as with converged data management (CDM) platform.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 108 may ensure that each task of the series of tasks is executed based on the ordering of tasks. Tasks that do not have dependencies with each other may be executed in parallel.

In some cases, the distributed job scheduler 108 may schedule each task of a series of tasks to be performed on a specific node in a cluster. In other cases, the distributed job scheduler 108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 108 may assign one or more tasks associated with a job to be executed on a particular node in a cluster based on the location of data required to be accessed by the one or more tasks.

In one embodiment, the distributed job scheduler 108 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 199 in FIG.

1B, to create a frozen copy of the virtual machine and to transfer one or more chunks (or one or more files) associated with the frozen copy to a storage appliance, such as storage appliance 170 in FIG. 1A. The one or more tasks may also include generating metadata for the one or more chunks, storing the metadata using the distributed metadata store 110, storing the one or more chunks within the distributed file system 112, and communicating with the virtualized infrastructure manager 199 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 112 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption-related tasks.

The virtualization interface 104 may provide an interface for communicating with a virtualized infrastructure manager managing a virtualization infrastructure, such as virtualized infrastructure manager 199 in FIG. 1B, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine). In this case, storage appliance 170 may request and receive data from a virtualized infrastructure without requiring agent software to be installed or running on virtual machines within the virtualized infrastructure. The virtualization interface 104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 106 may include a list of files that have been stored using a virtual machine and a version history for each of the files in the list. Each version of a file may be mapped to the earliest point-in-time snapshot of the virtual machine that includes the version of the file or to a snapshot of the virtual machine that includes the version of the file (e.g., the latest point-in-time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

In one embodiment, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks, and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 112 in FIG. 1C.

The data management system 102 may comprise an application running on the storage appliance (e.g., storage appliance 170) that manages and stores one or more snapshots of a virtual machine. In one example, the data management system 102 may comprise a highest-level layer in an integrated software stack running on the storage appliance. The integrated software stack may include the data management system 102, the virtualization interface 104, the distributed job scheduler 108, the distributed metadata store 110, and the distributed file system 112.

In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point-in-time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

Figure 2:
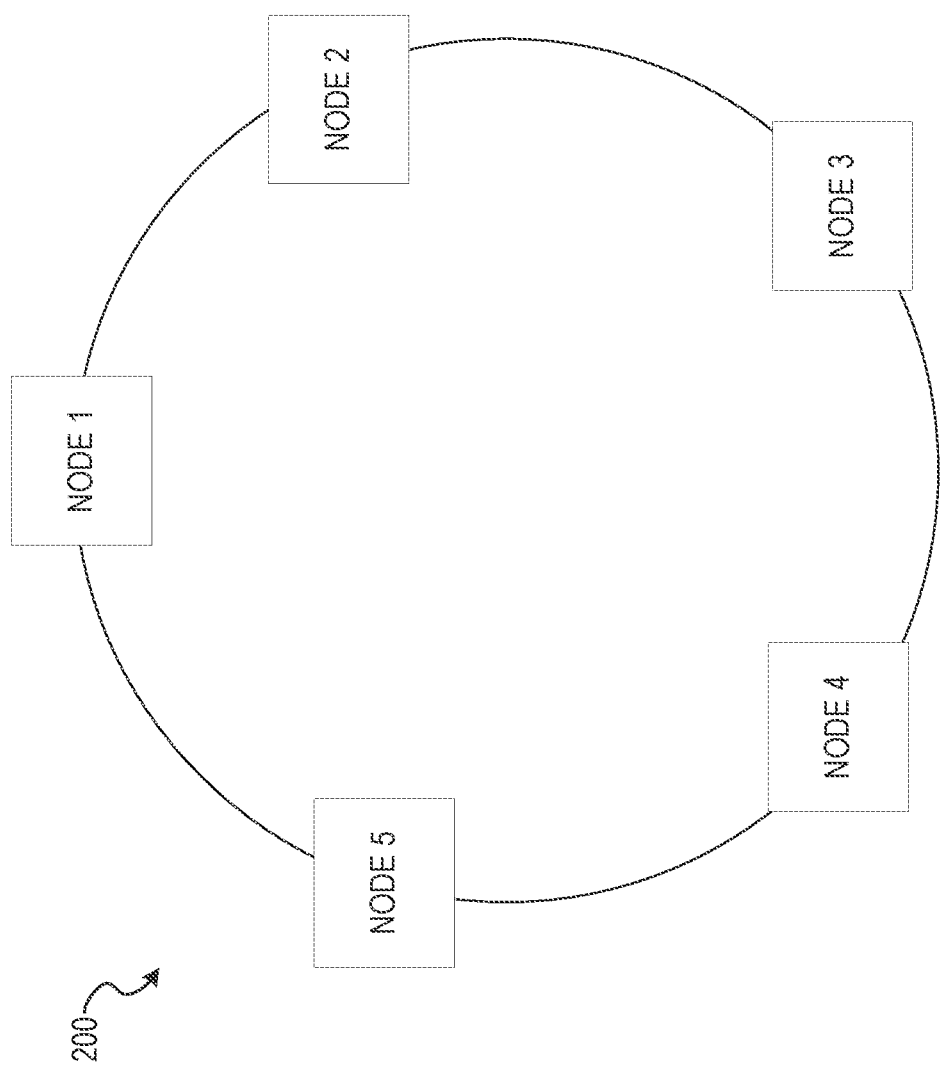
FIG. 2 shows an example cluster of a distributed decentralized database, according to some example embodiments.

FIG. 2 shows an example cluster 200 of a distributed decentralized database, according to some example embodiments. As illustrated, the example cluster 200 includes five nodes, nodes 1-5. In some example embodiments, each of the five nodes runs from different machines, such as physical machine 120 in FIG. 1C or virtual machine 198 in FIG. 1B. The nodes in the cluster 200 can include instances of peer nodes of a distributed database (e.g., cluster-based database, distributed decentralized database management system, a NoSQL database, Apache Cassandra, DataStax, MongoDB, CouchDB), according to some example embodiments. The distributed database system is distributed in that data is sharded or distributed across the cluster 200 in shards or chunks, and decentralized in that there is no central storage device and therefore no single point of failure. The system operates under an assumption that multiple nodes may go down, up, or become non-responsive, and so on. Sharding is splitting up of the data horizontally and managing each separately on different nodes. For example, if the data managed by the cluster 200 can be indexed using the 26 letters of the alphabet, node 1 can manage a first shard that handles records that start with A through E, node 2 can manage a second shard that handles records that start with F through J, and so on.

In some example embodiments, data written to one of the nodes is replicated to one or more other nodes per a replication protocol of the cluster 200. For example, data written to node 1 can be replicated to nodes 2 and 3. If node 1 prematurely terminates, node 2 and/or 3 can be used to provide the replicated data. In some example embodiments, each node of cluster 200 frequently exchanges state information about itself and other nodes across the cluster 200 using gossip protocol. Gossip protocol is a peer-to-peer communication protocol in which each node randomly shares (e.g., communicates, requests, transmits) location and state information about the other nodes in a given cluster.

Writing: For a given node, a sequentially written commit log captures the write activity to ensure data durability. The data is then written to an in-memory structure (e.g., a memtable, write-back cache). Each time the in-memory structure is full, the data is written to disk in a Sorted String Table data file. In some example embodiments, writes are automatically partitioned and replicated throughout the cluster 200.

Reading: Any node of cluster 200 can receive a read request (e.g., query) from an external client. If the node that receives the read request manages the data requested, the node provides the requested data. If the node does not manage the data, the node determines which node manages the requested data. The node that received the read request then acts as a proxy between the requesting entity and the node that manages the data (e.g., the node that manages the data sends the data to the proxy node, which then provides the data to an external entity that generated the request).

The distributed decentralized database system is decentralized in that there is no single point of failure due to the nodes being symmetrical and seamlessly replaceable. For example, whereas conventional distributed data implementations have nodes with different functions (e.g., master/slave nodes, asymmetrical database nodes, federated databases), the nodes of cluster 200 are configured to function the same way (e.g., as symmetrical peer database nodes that communicate via gossip protocol, such as Cassandra nodes) with no single point of failure. If one of the nodes in cluster 200 terminates prematurely ("goes down"), another node can rapidly take the place of the terminated node without disrupting service. The cluster 200 can be a container for a keyspace, which is a container for data in the distributed decentralized database system (e.g., whereas a database is a container for containers in conventional relational databases, the Cassandra keyspace is a container for a Cassandra database system).

In some examples, a Cloud Object Storage and Versioning System (COSVS) is provided. In some examples, the COSVS serves as a component of a data management system 102 as described herein. The COSVS may support primary Office 365 applications, including Exchange, One-Drive, and SharePoint. Backup functionality for such applications is provided in some examples by combining three areas of technology: SAAS platform that supports the scheduling and execution of arbitrary jobs, the implementation of specific jobs that execute business logic and interact with the primary applications via APIs, and COSVS. COSVS enables backups and restoring applications to efficiently store and retrieve different versions of items that have been stored from the primary application for potential restoration at a later time. Some characteristics of COSVS that make it useful for this may include the following:

It provides life cycle management and versioning of the items added to point-in-time snapshots of o365 applications.

It maintains information regarding the hierarchical relationships among the items stored in COSVS to support granular restores of objects like directories.

It provides global deduplication of identical content, including the ability to partially dedupe large content by splitting it into segments that can independently be deduplicated.

It uses abstractions for storing metadata and data that allow it to interoperate with different database and object storage interfaces, making COSVS portable across cloud computing vendors and different storage backends within each vendor (and even portable to physical backends outside of a cloud computing environment).

It is capable of packing many small items together into larger objects to achieve lower storage cost and higher throughput.

It is capable of minimizing costs by "tiering" or using different storage backends with different cost and performance tradeoffs.

It uses various background jobs that automatically optimize data placement over time to minimize cost and improve performance, partially by making use of hints that can be provided by the application regarding which data should be stored close together.

It is designed to efficiently make use of computation resources available to the host on which it is running, also contributing to higher throughput.

It is designed to be highly scalable and capable of overcoming limitations that may exist in the compute and storage services on which it depends.

It is designed to be fault tolerant so that it can recover to the most recent resumable checkpoint following many different types of failures of underlying dependencies, such as system crashes and remote procedure call failures.

In interacting with external systems, COSVS serves in one aspect as a software library that can be used by code that coordinates storage and restore operations. A relationship between COSVS and several external systems may be summarized as and include:

Data Source: in some examples, this is a user's primary application, such as Mailbox or OneDrive. Various "items" such as emails or OneDrive files are operated on by the user of the primary application. This generates a sequence of item mutations that include creation, renaming, modification, and deletion. Modifications to items may involve changes to the actual data or simply be metadata updates, or both. The data source can be queried in some way to obtain either an initial snapshot containing the current data, or a collection of changes that have occurred since a previous snapshot.

Client Application: in some examples, this is an application that uses APIs to interact with the data source to obtain item data and metadata for storage in COSVS. It also supports the ability to read data out of COSVS and use other APIs of the data source to push data back into the data source, which occurs during a restore operation for example. For the initial use cases of COSVS, the client application will be a backup application that protects old versions of data from permanent deletion and makes them easily searchable and restorable. However, the uses of COSVS may extend beyond backup. For example, analytics could be performed across various versions of data.

Job Execution Platform: in some examples, this platform includes the capability to schedule jobs that run the client application on Compute Infrastructure. This platform may also run internal background tasks that are endogenous to COSVS.

Compute Infrastructure: in some examples, this encompasses the infrastructure on which the client application's jobs run, including local resources such as compute, memory, disk, and network capacity. For example, Azure Kubernetes Service is one such example of Compute Infrastructure. The computer infrastructure may run the client applications as a serverless function.

Database: in some examples, this is a service that COSVS uses to store metadata. This could be a SQL-compliant database or a No-SQL database that supports atomic updates. For example, Azure Table Storage provides one such database.

Object Storage: in some examples, this is a service that supports the persistence of large amounts of data that does not necessarily support a rich variety of queries. One example of this is Azure Blob Storage.

Cloud Object Storage and Versioning System (COSVS): in some examples, a job execution platform can trigger client application jobs that run on compute infrastructure, wherein the client application queries the data source and inserts data into COSVS which leverages its own internal logic to coordinate the insertion of metadata into the database and data into the object store (though in some cases, small items may be stored in the database). Many versions of items can be stored by COSVS and a later restore operation can choose any version that has been retained to be read out for download to the user or uploaded back to a data source (often the original data source).

Figure 5:
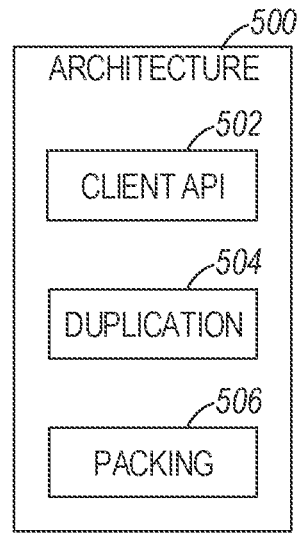
FIG. 5 depicts an example architecture of a COSVS.

With reference to FIG. 5, a layered architecture of an example COSVS may include some of the following aspects. In a high-level architecture 500 of COSVS, the system is designed in three main layers (502, 504, 506) which handle aspects of the functionality and efficiency described above.

Client API Layer (502): in some examples, this layer provides an interface to the client application to facilitate storing and querying different versions of content that was originally obtained from the data source. An abbreviated summary of the interface may include the following:
AddItem(itemID, version, itemMetadata, itemData)
DeleteItem(itemID, version)
QueryChangedItems(itemIDPrefix, version)
SearchItems(<various search criteria>)
ReadItem(itemID, version)

The itemID parameters above may be chosen by the client application and may have lexicographic meaning, such as the path of a file in OneDrive. The version parameters numerically describe the time at which the item in question changed to this state. Note that queries may return the item with the most recent version as of the version specified in the parameters. The client API layer handles all details related to item metadata as well as the relationship among different items and versions. All storage concerns are delegated to lower layers, and the client API layer interacts directly with the deduplication layer. To reiterate, each item added spans its life across a set of contiguous versions. When an item is deleted or a new version is added, the previous version, if it exists, finishes its lifespan. While reading items, all items updated during a particular snapshot can be iterated over, and querying specific items at a particular version is also supported.

Deduplication Layer (504): in some examples, this layer is only concerned with storing content and is not concerned with item metadata or semantic relationships among items. Example deduplication operations may include those described elsewhere herein. The deduplication layer acts as a key-value store to be used by the client API layer, but in this case, the key does not have semantic meaning and may simply be a UUID. An abbreviated summary of the interface is the following (only some details provided for clarity):
AddContent(contentID, data)
DeleteContent(contentID)
ReadContent(contentID)

As mentioned above, the contentID parameters can generally be thought of as UUIDs that are generated internally inside of COSVS, and the data parameter is just the raw itemData from the client API layer.

This layer's main responsibility is to deduplicate content, which it does using content hashes (e.g., SHA-256) of content that is ingested and creating an index of content that is keyed by this content hash. When newly added content has a content hash that matches that of existing content, this layer does not store the newly added data, just a reference to the existing data. These references are managed via a state machine to avoid races between creating new unique content and adding or removing references to such content that is pre-existing. Like the client API layer, the deduplication layer stores only metadata and delegates the storage of the data to the innermost layer of COSVS, the packing layer. It is worth noting in this summary that the deduplication also supports the ability to "segment" ingested content, so that larger contents are broken up into smaller chunks that can be deduped separately, allowing for more granular deduplication, greater parallelism during ingest, and lower memory and disk utilization during ingest because the deduplication need not retain an entire large object in memory or on disk during ingest. The specific details of deduplication are meant to be configurable so that the segment size can be varied and, in some cases, deduplication can be bypassed (e.g., for numerous small contents that are known to be mostly unique and unlikely to gain efficiency through deduplication).

Packing Layer (506): in some examples, this layer is concerned only with efficiently storing and retrieving bytes. Its most important purpose is to convert many small key-value operations that are issued to higher layers into large write and read operations of the object storage component. An abbreviated summary of the interface is the following (only some details provided for clarity):
AddUnit(unitID, data)
DeleteUnit(unitID)
ReadUnit(unitID)

Similar to the deduplication layer, the packing layer provides a key-value store interface, and the keys have no semantic meaning outside of COSVS, though internally, they are constructed by concatenating the content hashes from the deduplication layer with a UUID. The extra UUID is used for robustness to simplify handling content hash collisions between add and delete operations, that when adding and deleting operations for the same content, content hashes are executed concurrently. Note that to avoid confusion, some examples herein refer to the key-value pairs at this layer as "unitID, unit" as opposed to "contentID, content" in the deduplication layer and "itemID, item" at the client API layer.

The purpose of this "packing" is to save both money and time as many implementations of object storage have a fixed cost associated with each write or read operation, and have high throughput, but also high latency, so that performing many small operations will be costly and slow. To achieve this high-level objective, smaller units are combined together into a single "pack" and written together while larger objects are stored by themselves as a single key-value pair in the object store. Metadata pertaining to the liveness of each unit is stored in the database. Background jobs perform additional operations to continuously optimize the layout of the packs by combining many small packs into fewer large packs, compacting packs whose data consists heavily of deleted data, and moving data to different tiers of storage, all based on user policies and cost optimizations. These operations can either be performed separately or together.

Some auxiliary components of COSVS and their relationships to the three main layers are now described:

Intent Logger: in some examples, the client API layer uses the intent logger component to provide rollback functionality when data is ingested so that leaking data may be avoided in COSVS, for example when crashes or power outages occur. This resilience is achieved by first recording an "intent" corresponding to each operation that is submitted to the client API layer so that in the event of a crash, examples can iterate over all submitted changes and perform an idempotent delete operation on all data that might exist in COSVS that examples wish to rollback before examples re-attempt an ingest to get into a consistent state that does not leave any live data lingering in COSVS. Lower layers do not need an intent logger because the lower layers are structured such that any delete operation in the lower layer is idempotent and so that a single successful call to delete is sufficient to clear all artifacts of the previous add operation. Intent logger is the component in the system that takes the final responsibility of tracking what needs to be undone in the system so that such a rollback of add operations can be set in motion at the client API layer.

Metadata Store: as mentioned above, COSVS depends on the ability to store and query metadata atomically in some fashion, as well as iterate over keys matching a given prefix. For the purposes of COSVS, examples have abstracted these requirements into an interface that describes a minimum set of operations that COSVS actually depends on. This interface can be implemented as a wrapper around various SQL and No-SQL database options, such as Azure Table Store, any SQL database, or even a custom implementation that operates directly on top of a filesystem or object store. This allows us to make tradeoffs regarding performance, cost, deployment effort (e.g., managing a service ourselves), and development effort (e.g., implementing our own solution) across various options and easily make changes without heavily modifying the rest of COSVS.

Object Store: as mentioned above, COSVS depends on the ability to store large amounts of data, and an object store such as Azure Blob Store or Amazon S3 is a natural interface. To ensure portability, COSVS includes a generic interface for its object store dependency so that different solutions and vendors can be used, allowing us to make tradeoffs similar to those in the above description of the metadata store component.

Some implementation aspects are now described. These may include design features that are included in the above-mentioned components of COSVS. Some challenges, itemized below, are addressed by such features.

Storage Configuration: one challenge associated with scaling COSVS to many users is the lack of scalability of many database and storage implementations, which may have limits to the number of operations per second that are supported, and additionally limits to the amount of data that can be stored. For example, Azure Table Store currently supports a maximum of 20,000 operations per second per storage account. This creates a challenge for scaling COSVS to large organizations with a large amount of data to protect. A general approach for dealing with such a problem is to shard data across multiple backends (for example, examples can use multiple Azure Table Storage accounts to be able to perform more than 20,000 operations per second). However, a number of associated challenges can arise with such sharding.

One challenge can include determining, ahead of time, how to split up data across users (for example, how many users will later be added, or how much data will they have in the future). To address such questions, examples of a COSVS may include a configuration that can be set on a per user basis that describes the backend to be used for each type of metadata or data operation. For example, each newly added user can be assigned a storage account to use based on the current load associated with a pool of configured storage accounts. New storage accounts can be added to the pool if the limit of the existing accounts is being approached so that additional users that are added are assigned one of the new storage accounts.

A further challenge may include a desire or need to avoid costly data or application migrations when possible. If assigning new users to a new storage configuration setting, for example, is not sufficient to relieve the strain on the most heavily loaded storage accounts, examples may need to re-assign some users to different storage accounts based on load. This would be straightforward to achieve if examples were willing to migrate all existing data for such users to the new configuration, but this could be costly, so examples support the ability to have the user use two (or more) configurations: one for old data and one for new data. Thus, newly ingested data could use the new configuration while previously ingested snapshots could continue using the old configuration. Additionally, data that is rewritten in background jobs could use the new configuration. With this type of split storage configuration, some queries would need to be duplicated to ensure that examples find data that is present in either storage account.

A further challenge may include a need or desire to avoid or minimize scaling constraints for large users. Assigning different users to different storage configurations may be insufficient to achieve optimal performance if limits of a particular backend are being hit from the temporary or sustained load from even a single user. To handle this case, storage configurations can assign different content from a user to different backends. For example, each database table can potentially be assigned to a different account, and tables that require only point queries or limited prefix queries may be split among accounts (e.g., a user may have a storage configuration in which keys starting with A-M access account1 and keys starting with N-Z are stored in account2). Note that such a configuration could still potentially be shared by multiple users, which would help each such user burst to a higher maximum throughput, even though the aggregate throughput would still be capped at the sum of the capacities of the accounts.

A further challenge can include a need or desire not to sacrifice deduplication. One problem with sharding users into different storage backends is that examples may lose some deduplication. For example, suppose a large file is backed up for 10,000 users in the same organization and these users are split among 20 storage accounts. If examples use a naive storage account configuration, examples may need to store 20 copies of the large file in the backend, one for each storage account configuration. This situation can be improved in some examples by using a different metadata sharding scheme for the deduplication layer so that all content with the same hash is stored in the same database. In one example, to achieve a more complete global deduplication, sharding is not used in the deduplication layer and a separate storage account is used to store all content in the deduplication layer to limit the impact on scalability. If sharding is still required to achieve good throughput in the deduplication layer in this setup, examples may still shard as in the client API layer, but do so more coarsely to limit potential impact on data reduction. Alternatively, some examples shard into storage accounts in the deduplication layer lexicographically, using content hashes to preserve complete global deduplication while maintaining scalability. Some examples also take content size into consideration so that for small items such examples shard the deduplication metadata as in the client API layer, but have a single storage account for deduplication of larger contents so they can be completely deduplicated. Using these approaches, some examples can deduplicate data in the above example with 10,000 copies of a file down to significantly fewer than 20 copies, and perhaps all the way down to just one copy, without sacrificing performance at scale. In some examples, if such users are configured for sharded storage accounts only for a subset of metadata, but share the same storage backend for content that is larger than a threshold, examples can achieve both scalability and global deduplication in which examples not only dedupe the 10,000 copies down to 20 copies, but possibly all the way down to one copy. To solve both scalability and global deduplication, examples can even combine the table sharding mentioned above with the heterogeneous table sharding scheme mentioned here.

Some examples facilitate the support of new implementations of a database or storage backend, in some instances concurrently with other implementations. For example, examples may later find that it is cheaper and/or more performant to use a completely different implementation for some database tables. For example, data that does not need to be accessed globally could use an embedded database that uses blob storage directly as its backend. An example of such data that does not need to be accessed globally is item metadata in the client API layer of COSVS. The storage configuration allows such a configuration to be made dynamically for new data without migrating old data.

Even if some examples do not incur scaling challenges for some backends in some environments, some examples nevertheless retain optionality in this regard. For example, if a suitable backend that provides sufficient scalability exists and is not costly, the complexity associated with some configurations above may not be necessary, in which case the configuration can be the same for all users and all times. However, it is still helpful to have the flexibility of a storage configuration to avoid large changes to the code or data migrations to handle diverse environments or changing requirements.

In some examples a client application may need to provide geographic storage constraints. To address this challenge, the storage configuration can be partially set according to policy to satisfy geographic requirements. For example, if all data for certain users must reside in some geographical location, the storage configuration can be set to use only backends that reside in that location.

Scratch Store: To relieve memory allocation and garbage collection overhead, one implementation of a memory-based scratch store uses a collection of fixed-size buffers that are re-used rather than allocating a new buffer to store each newly added content and freeing the buffer when it is no longer needed for that content. One problem with fixed-size buffers is that if they are large enough to store the largest contents, small items will leave a lot of empty space, and if a collection of different-sized buffers is used, some distributions of content sizes would still result in low buffer space utilization and high memory waste. To achieve higher memory utilization, small buffers are used that can be stitched together to form a larger buffer in which reads and writes of large contents are broken into chunks that fit into these buffers, leaving only one partially-filled buffer. When not in active use, these buffers are stored in a stack data structure (last in first out) so that the memory working set is kept as low as possible, which can lead to less memory pressure on the system and better cache performance. This scratch store implementation can be combined with other scratch store implementations to create a hybrid scratch store in which a store is chosen for each content individually based on load, size, or other criteria, for example if the overhead associated with stitching is too high for some use cases, or if disk needs to be used. Scratch store is a key-value store for temporary data that is used internally in COSVS. For example, the deduplication layer stores content in scratch store after downloading it from the data source so that it can hash the downloaded content before it decides what to do with it. The keys are defined by scratch store handle IDs and the values are the actual data belonging to the key. Scratch store is capable of storing the temporary data either in memory or on disk depending on caller's preference. It is initialized with the total amount of memory and disk space available and internally tracks used memory and disk space. When writing to scratch store, callers specify a requirement or preference for disk or memory, and if space is unavailable a NoSpaceAvailable error is returned. The key challenge of COSVS solved by scratch store is resource management for ingest operations. It helps ensure COSVS does not consume too much memory or disk, supports easy tuning for different platforms, and also hides the details of whether content is stored on disk or in memory to simplify the caller's code. Described below are some end points of scratch store:

WriteContentFromReader: allows clients to write content to scratch store. It takes the key, the size of the content, the write level (disk/memory/prefer-memory) and a reader to the content as arguments, and writes the content to the scratch store with the provided key. Before writing it acquires semaphores according to the write level to reserve the space. While writing, it also validates that the size written is equal to the size provided initially to avoid faulty clients from misusing scratch store.

GetContentWriter: is similar to the above endpoint and provides a way for clients to write data into the scratch store. It returns back a write-closer and clients can write the data into the write-closer. Clients will have to call Close( ) on the write-closer or else the content written cannot be read back as scratch store commits the content only when Close( ) gets called.

GetReadCloser: allows clients to get a read-closer for the entire content that was previously written to the scratch store with a specified key.

GetSegmentReadCloser: allows clients to get a read-closer on a segment/substring of the content that was previously written to scratch store with a specified key.

ContentSizeInBytes: can be used by clients to get back the size of the content that was previously written to the scratch store for a specified key.

DeleteContentIdempotently: allows clients to delete existing content from the scratch store for a specified key. As a part of this call, scratch store releases the previously acquired space semaphores so that the space can be used by some other client. As suggested by the name, this call is idempotent.

Client API Layer Details: as mentioned above, the client API layer of COSVS provides an interface to the client application for storing and reading items that belong to a snapshot from a data source. At a high level it is analogous to a versioned key-value store where the keys can be added, updated, deleted, read, and iterated, with all operations being temporally aware so that specific previously written values can be read or deleted as of the specified version number. Examples next discuss the implementation of several subcomponents of the client API layer:

Writer: provides the ability to manage a sequence of key-value write operations for a particular version number, while also supporting rollback and resumability in the case of failures. It is instantiated with a particular version number $v\_w$ and supports the following operations:

AddItem(key, value): creates a metadata entry for the key with version number $v\_w$ and passes the value to be stored to the deduplication layer with an internally generated key, which is retained in the client API layer metadata. The metadata entry is stored as a record in the metadata store with record ID composed of concatenation of hash of key (SHA256), writer version number ($v\_w$), and an "intra writer version number," which is used for versioning of keys within version $v\_w$ and facilitates recoverability and resumability in case of a failure or crash.

DeleteItem(key): finds the last metadata entry of the key provided and ends the key's lifespan with the current writer version by updating its metadata entry.

Sync(token): upon calling and returning successfully ensures that all previous AddItem and DeleteItem operations are fully persisted in COSVS.

GetLastSync( ): is used to get the token of the last successfully completed Sync( ) call to resume writing content from after that particular sync. The client API layer restores the state of COSVS to the last Sync( ) call by rolling back all of the AddItem and DeleteItem operations executed after it using the information stored in IntentLogger.

Commit( ): is used to mark the completion of the writer and make that particular writer version immutable to any further change and to use as a read-only object.

Discard( ): terminates the lifecycle of the writer and removes all changes that have been added so far as part of the snapshot that is currently being written. Discard is idempotent so it can be called multiple times until success is confirmed.

Each AddItem and DeleteItem operation is first added to the intent logger described in a previous section to support rollback of unsynced operations in case of failures or crashes.

Reader: A Reader can be formed on a committed version $v\_r$. The Reader's main operations are GetItems([ ]key) and GetAllItems( ). For getting a particular key, the ClientAPI layer uses prefix matching capabilities of the MetadataStore to check if there exists a metadata entry with a prefix smaller than concatenation of key and the read version number (key+$v\_r$). If such a metadata entry exists and the lifespan of the entry overlaps $v\_r$, the value corresponding to the key is retrieved from the deduplication layer and returned to the application.

Index creation: The client application may need to provide the ability to browse and search for items that have been stored in COSVS. To support this, COSVS keeps an index of all the write operations that were successfully synced while writing a version along with additional search attributes to be included in an index. The complete curated index can be retrieved by the application after committing the version.

Background Jobs: The lifetime of each item spans a contiguous set of version numbers. The client application can choose to mark a version as deleted and no longer required to be read from. If an item version is marked deleted, the item is removed from the client API layer and the underlying content is deleted from the deduplication layer. Note that there may be multiple versions of an item sharing the same content, and this would not happen until all versions sharing the same content were deleted.

Deduplication Layer Details: performs add, delete, and read operations in batches so that the client application can proceed without waiting for everything to be completely persisted. A final sync call on the batch triggers everything to be persisted and waits for this to complete. Some additional details regarding these operations are the following:

AddContent(contentID, contentData): first splits the data into segments that are sized according to a configuration, registers listeners for segment completion events for all segments, and then submits work specs into a pipeline of workers. The first stage of the pipeline downloads and hashes the segment using a collision-avoiding hash function (e.g., SHA-256), the second stage checks whether this hash already exists by querying the metadata store to see if this content is already stored, and either adds a reference to the current content and notifies the listener of success, or creates a new content metadata row and proceeds to the third and final stage of the pipeline in which a call to the packing layer is made to persist the new content, keyed by the hash combined with a UUID to avoid races involving colliding hashes. The packing layer provides a listener for ingesting result notifications, which are listened for in the deduplication layer and triggers finalization of the deduplication metadata for the AddContent call. As mentioned above, the choice of segment size involves a tradeoff between the cost of the metadata operations, the granularity of deduplication between similar ingested objects, and the amount of memory or disk required to perform ingest. Note that all hashed content must be staged in process prior to routing it to the packing layer so that deduplication can be performed in-line so examples can avoid the cost of writing data to object store that will be deduplicated off-line. Note that contentData is actually a reader that does not necessarily simultaneously store all data from the content locally, either in memory or on disk. Instead, a reader is provided and smaller read operations retrieve the data, which either resides in the scratch store mentioned above or is obtained directly from the source, and still staged in scratch store while being processed in the deduplication layer.

DeleteContent(contentID): is asynchronous like AddContent and handled by a pool of workers. The actual task of deleting the content simply involves marking the content as "expired" at the current time and adding the content to a separate table for deleted contents. Final removal is performed by a background job that scans this table and removes the relevant hash references, and if no references remain the job deletes the content from the packing layer and clears the deduplication layer metadata for the content. Having a separate table for deleted contents makes this background job efficient because it only inspects deleted content rather than scanning all live content to search for what may be a relatively small number of deleted contents.

ReadContent(contentID): provides access to an implementation of the reader interface that operates by stitching together all of the segments of content into a single contiguous stream of data, hiding the details from the calling code for simplicity. To achieve this, an iterator over the segment metadata is obtained via a prefix query to the metadata store, and each entry of the iterator can then be used to load the actual content of each segment, in order, from the packing layer. To improve performance for large reads, examples perform read-ahead asynchronously to prepare later segments to be read more quickly when examples reach the end of each segment. This read-ahead involves loading the next segment's metadata from the above iterator and obtaining a reader for the corresponding raw data from the packing layer.

Some examples include additional design features:

Result Notifications: Each asynchronous call to AddContent leads to two results reported for each successful piece of content that is ingested. First, a successful download is reported, and second, successful persistence is reported. The reason for this is to be able to skip error-handling in some cases in which examples expect the download to be very flaky. For example, if a download error response is returned, the client application may simply decide to ignore the error and not ingest that content. On the other hand, if the download is successful, the client may wish to aggressively retry errors because the errors were internal to COSVS and its storage backend dependencies, which generally have a much greater guarantee of robustness than remote-procedure calls to third party data sources that are out of the control of COSVS and the client application.

State Machine: To provide robustness in the case of races and failures, a state machine is used to define the life cycle for each segment, and its state is stored in the metadata store and updated via atomic operations. This state machine includes four states: CreatingHash, Ready, AddingRef, and RemovingRef. State transitions are only allowed as follows:

Nonexistent=>CreatingHash

CreatingHash=>Ready

Ready=>AddingRef, AddingRef=>Ready

Ready=>RemovingRef, RemovingRef=>Ready

The above states are updated using atomic metadata store operations and include an owner ID so that examples can recover in case of a failure. For example, if there is a crash after transitioning to AddingRef state, a retry can be attempted in which the owner is recognized as being the current job.

Pipeline: Again, this layer (and others) use a pipeline approach in which blocking operations are performed in worker pools and forwarded to the next stage of the pipeline, which allows COSVS to scale vertically across a wide range of host compute strengths while maintaining good utilization. On small systems, the COSVS pipeline will get blocked with a small amount of throughput at some stage due to network bandwidth or CPU constraints and other stages of the pipeline will naturally slow down so that the process does not suffer overload. On large systems, utilization increases naturally with high levels of parallelism at each stage in the pipeline, and resource utilization is controlled at each step of the write and read process.

Packing Layer Details: the interface is similar to that of the deduplication layer with methods for adding, deleting, and reading units, but the implementation as described below emphasizes data layout instead of deduplication. Like in the deduplication layer, write operations are executed in batches that are only guaranteed to be persisted after a final sync call on the batch. Some additional details regarding these operations are the following:

AddUnit(unitID, unitData): checks the size of the unit to be added, and if it is smaller than a configurable threshold, routes it to a worker that includes the unit in a single pack with many other units. Otherwise, examples send it to a worker pool to be packed by itself in a one-unit pack. The addition to a pack involves another pipeline of asynchronous tasks, performed by one or more workers at each stage. The first task is to insert per-unit metadata. The second is to append the content to the object store (which may be buffered), and also insert the metadata into an in-memory index. The third task finalizes the per-unit metadata. If examples passed the threshold to complete a pack, examples flush the index to the object as a trailer, include a final version number in an additional trailer, and finalize the pack metadata, which includes adding a bitmap that keeps track of which units in the pack have been deleted. Note that such pack metadata would have initially been inserted once the new pack was created so that in the event of a crash, examples could find any leaked content in the object store by scanning through the pack metadata.

DeleteUnit(unitID): operates in batches with asynchronous workers like AddUnit so that examples can more easily achieve high throughput, and performs metadata-only operations to mark the unit as deleted. This is done in three steps: first, mark the unit as expired; second, update the pack utilization; and third, delete the unit metadata. The reason for this is to make the process idempotent so that a failure at any point does not result in content being leaked (e.g., if the unit metadata were deleted and the process crashed before the pack utilization could be updated).

ReadUnit(unitID): queries unit metadata to find the pack and offset, then returns a reader that wraps the object store reader to translate the offset and perform decryption and decompression as necessary. It can be extended to read-ahead so that examples can read many or all segments in a single pack in one shot, avoiding querying the unit metadata and instead relying on the pack's index to find the offsets of the units. The index can also help with recovery in the event of metadata loss.

The packing layer also relies on background jobs to clean up deleted data and reduce the number of packs examples have if there are many small or largely empty packs. Examples run a periodic consolidation job that looks at pack utilization and finds packs that can be rewritten and possibly combined with others to form a smaller number of possibly larger packs that have a higher proportion of unexpired content. This job makes use of a locality hint that is provided by the client application to keep units that are logically "close together" in the same pack if possible. For example, units corresponding to files in the same folder in the data source may be packed together, leading to faster restores and cost savings because of fewer API calls during restore.

NoSQL Database Handler Details: NoSQL database handler is a module in Golang that abstracts characteristics of a database for it to be used as a metadata store of COSVS, including various database operations, schema management, and data access objects (DAOs). It makes use of reflection to automatically convert Golang DAO struct objects into database queries. This layer exposes the below endpoints:

CreateTable—can be used to create a new table
PersistAtomically—can be used to persist a new row atomically to an existing table
UpdateAtomically—can be used to update an existing row atomically in a table
Get—can be used to get/read a row from a table
ReloadDAO—can be used to reload the in-memory DAO's state from the database state
DeleteAtomically—can be used to delete a row atomically
DeleteTable—can be used to delete a table from the database
GetRowsIterator—can be used to retrieve an iterator over the rows of a table with some conditions, such as prefix filters, min-max queries, etc.

Alternate Approaches

Improve dedupe: examples can route to a storage account based on minimum hashes, and can dedupe smaller segments by storing the index in an in-memory database to mitigate the need to perform a large number of slow or costly remote index lookups.

Delta ingest: some data sources may support the ability to only ingest changes to content. This can be supported by COSVS via the segmentation mentioned in the previous sections and in the above improvement to dedupe. In such a case, examples could ingest the new content, and simply add references to the previous content's segments, or if such segments were small and numerous, examples could further optimize this by using concepts similar to the CDM BlobStore.

Tiering and cost management: data can be assigned to a tier based on policy to save money on storage costs at rest at the cost of slower and/or more expensive access. This can be set to apply to specific snappables/users for data of a certain age. The background jobs of COSVS can estimate the cost savings associated with compaction and consolidation, as well as tiering, and determine whether it is worth the upfront cost.

Distributed ingest and restore: multiple batches can proceed in parallel in the dedupe layer and below. These batches can be run on different remote machines and the results can be sent via RPCs instead of in-process channels. Examples could even extend the client API layer to be distributed if a very large snappable from some data source supported the ability to have its contents queried in parallel. In such a case, for example, different workers could ingest different folders from different hosts when creating a single snapshot of a single snappable.

Some examples relate to arbitrary efficient batch data processing that can support batch read operations allowing custom code to operate over all versions of all items that have been ingested. For example, if code from a client application can scan a stream of bytes for malware or sensitive information, examples can allow this logic to be executed easily and efficiently across all data stored in COSVS. The client code can provide a callback that receives the item metadata and a reader for the item's data and COSVS can scan through all of its data and make the relevant callbacks. This can be done quickly and efficiently by forking multiple worker processes on different machines and making use of readahead optimizations so items in a single pack are processed together. Search criteria can be provided to such a job so that only a subset of data is processed (e.g., a subset of items and/or snapshots). Resulting output can be combined to extract output from the job. Batch restore is another example of an application that can be implemented with this framework.

Some examples relate to arbitrary stream processing that can support the addition of arbitrary stream processors configured to run code from a client application on all newly ingested content. In this case, the client registers one or more callbacks that receive item metadata along with a reader and would run alongside ingest and process all newly ingested data. Examples of applications include scanning for malware or sensitive data. Results of callback execution can be combined for a single snapshot job or be processed one-by-one as a stream, in either case using arbitrary injected code to provide updates to the client application regarding the results of the stream processing.

Continuous data protection: the above discussion involves the notion of snapshots, but examples may extend COSVS such that restoration could occur as of any point in time. Expiration in this case may include a retention threshold and possibly a limit on the number of item versions within a period of time.

Event-driven ingest: some data sources have the ability to listen for changes. Examples could ingest such content to support real-time continuous data protection, or at least pre-ingest content into a staging area where it could be accessed during the next snapshot job. Some examples include a pack read-ahead for batch reading of many units that fall in the same pack, unrelated to event-driven ingest.

In some examples, the COSVS provides a generic snapshot store that can be used across many data sources. Features may include:

Global dedupe across users and data source types (mailbox attachments and OneDrive files together).

Distributed ingest of backup source data across multiple users or even for a single user.

Historical hierarchical changes.

Failsafe full backup without duplicating all the data.

Secure delete via forced compaction of all packs.

Horizontally Scalable—Sharded NoSQL and object store, with multiple accounts to go beyond size limits per account.

The COSVS may include a cloud metadata store and aspects relating to a local database versus a global database for performance and cost optimization. Features may include:

Scratch store for caching downloaded content. Resource manager for space, download only once.

Metadata store, abstracted and modularized, can be remote or local implementation.

Sharding across multiple storage-accounts for improved scalability.

Cached-file system-like interface for writing content that is partially remote and needs to be downloaded.

Intent log, i.e., redo and undo write-ahead log on top of a key-value store.

Pipelined writes with two asynchronous responses for write acknowledgement and durability so that the application layer can decide whether to skip an item for which download specifically fails.

Dedupe—multiple entries for the same hash to deal with in-progress ingests failing.

Segmentation—avoid disk use, improve deduplication, allow processing large files efficiently, and with granular retries.

In some examples, garbage collection after expiry in the client API layer uses snapshot numbers. Some examples determine or identify an empty range of snapshots, for example by using range/prefix queries of the metadata store. In the client API layer, garbage collection can be performed by a periodic background job that checks the liveness of every version of every item in the system. The liveness of a version of an item can be determined by comparing its lifespan to the timestamps of live snapshots, or with live intervals in the case of continuous data protection. This process can be optimized to require less compute resources and fewer database operations by keeping an index that stores all item versions that do not live in the most recent snapshot. The death timestamp of each item version can be used as the prefix of the primary key in the index. Then, when a snapshot is deleted, we can perform an efficient range query to find item versions that "died" between the timestamp of the newly deleted snapshot and its successor. The subset of such item versions that were born in the interval between the newly deleted snapshot and its predecessor are newly eligible for garbage collection. Some item versions may span many snapshots and therefore could be scanned many times by this process before being deleted. To avoid this waste, we can prepend the hyperfloor of the duration of the lifespan (i.e., floor(log_2(lifespan))) to each key in the index and only process each key whose lifespan's hyperfloor and death timestamp suggest its birth timestamp may be after the newly deleted snapshot's currently live predecessor. For example, the above range query can use an item version death timestamp lower bound that is at least the greater of the timestamp of the newly deleted snapshot and that of its live predecessor plus 2^hyperfloor(lifespan). This involves only a small, at most logarithmic, number of range queries, one for each value of the hyperfloor of an item's lifespan that could correspond to a newly garbage collection-eligible item version. If an index entry in this setup is scanned in this way and is not eligible for garbage collection, we can update its death timestamp to (birth timestamp+ 2^hyperfloor(lifespan)) to ensure it will never be scanned again until it is actually eligible for garbage collection.

In some examples, a COSVS hierarchy captures a hierarchy of parent-child relationships and their mutations throughout time.

In some examples, a COSVS includes deduplication and segmentation, allowing global dedupe across users and data source types. Examples may include:

A global database of hashes for all content for this purpose.

Reference-based garbage collection for cleaning up the data after content gets deleted. To allow garbage collection to run independently between the client API and deduplication layers, we can maintain a list of deleted contents or content segments in the deduplication layer, and updates to reference sets and content states can be performed in a separate background garbage collection job from that of the client API layer, which would only perform deletions in the deduplication layer by inserting into a database table that only stores deleted content.

Segmentation—split incoming content into multiple segments for improved deduplication and efficient handling of large content.

Fixed Segments—using fixed segment sizes for content.

Variable Segments—variable length segmentation can be done by making use of min hash and Rabin-Karp rolling hash algorithms.

Calculate min-hashes of the segment and look at the global table index to find a container that contains most of the min-hashes. Each container may be equivalent to a segment, but it stores the underlying data by segmenting the segment into smaller chunks or blocks of size 1 KB. It stores the index of this in the blob store. The index includes a mapping from segment+offset->hash.

Examples identify a compatible container for a segment, and send this segment to the container in seek sufficient dedupe capability from that particular container. Examples use the index of this container to dedupe the segment's blocks using the container's blocks.

If there is a failure to find any container, a new container for this segment is created. Examples allow multiple entries with the same hash to deal with concurrent ingestion of same content and races elegantly and without introducing blocking. Even though a global database is used, multiple ingests can happen from multiple backup clients The deduper is capable of serializing operations on the same hash. If there is a long wait time on the same hash, the deduper creates a new entry with the same hash by appending a UUID to it. Asynchronous garbage collection jobs remove duplicates inside dedupe layer, and hash state transitions may be used to figure out races.

Some COSVS examples include metadata storage. Examples may include a generic interface that can serve any NoSQL database. Features may include:

Sharded NoSQL store, with multiple storage-accounts to go beyond size limits of a single storage-account.

Local-DB vs Global-DB for performance and cost optimization.

Lexicographic order compatible base64 encoding usage to store byte array keys into Azure Table.

Usage of reverse numbers to get the latest results using top-1 prefix query.

Caller ID to verify whether changes are done by one given caller in case of server errors from Azure Table.

If an entity already exists or similar entity conflict error occurs during an atomic insertion or update, the caller ID is checked against that of the reloaded object.

If the caller IDs match, the change was made in this call and the error should be disregarded.

Some COSVS examples include a packing layer. Features may include:

Maintaining locality of data in the content store across multiple ingestion sessions through consolidation using a locality hint.

Each unit added to the packing layer has a locality hint associated with it.

Units with same or lexicographically similar locality hints are usually read together, so should be kept in the same pack if possible.

Examples maintain units with similar locality hints in the same pack with high probability even if they are added across multiple ingestion sessions through the background process of consolidation and compaction.

During compaction, examples determine eligible packs and all the live units within them and form new packs after sorting them by locality hint.

Some examples enable faster restore operations and cost savings because of fewer API calls during restore.

Asynchronous compaction in the packing layer, including cost optimizations.

Compaction is a background job that frees up space occupied by expired units, combines small packs created from incremental backups, and helps to maintain locality of units.

Some examples herein include criteria for a pack to be eligible, such as aliveness threshold, and criteria to run a consolidation operation. Implementation of the criteria can enable cost savings from storage freed up in some examples exceeds associated write amplification cost.

Support for both many-to-one (cost optimized) and many-to-many (locality optimized) compaction of packs.

Made idempotent by maintaining pack state in the metadata store.

Liveness bitmap in pack—atomically update utilization and deletion status. Helps with compaction and consolidation.

Compact representation of the liveness of every unit in the pack through a bitmap where each bit corresponds to a unit in the pack and set to Alive or Dead.

With the liveness bitmap, examples can atomically update the utilization of the pack using compare-and-swap, thereby avoiding incorrect pack utilization stats in the metadata store.

Some examples herein include object store abstraction. Features may include:

Generic interface to operate with any object store.

Asynchronous design for performance across a wide range of IO patterns.

Checkpointing and resumability on top of an append-only blob store.

Sharded object store, with multiple accounts to go beyond size and performance limits of a single account.

Buffering of writes and reads to reduce time cost and financial cost of accessing data in object storage.

Some examples include ongoing maintenance. Examples include collecting together the background jobs of the COSVS in an API, deduplication and packing layers.

Some examples include indexing. Features may include:

Snap files to collect indexable attributes, for separate indexing with Lucene, separating indexing from core data-management.

Generic indexing framework that allows any data type to be plugged in with minimal effort.

Some examples include resumability. Features may include:

Intent log—redo and undo write-ahead log on top of key-value store.

Checkpointing and resumability on top of an append-only blob store.

Some examples include tiering and cost management. Features may include:

Use of hot, cool and cold storage tiers to reduce costs for data storage.

Allow customers to set a policy regarding how long data should remain available for near-instant access (e.g., one month), and allow any older data to be moved to the archival tier.

Examples may add a background job that scans data to find data that does not have any references from new snapshots (either via dedupe or implicitly via incremental dependence) and split packs containing such data into hot and cold portions so that only the cold portions are archived. Dedupe should be aware of the tier of a copy of data so that new ingests do not dedupe against archived data. The tiering background job can simply add a reference to the archived copy and delete the hot copy if the hot copy ages out.

Estimates of background job costs can be made based on metadata and object store read/write statistics. Examples can also estimate the cost and value associated with compacting and archiving packs and perform cost benefit analysis to determine the frequency of background scans and whether to perform compaction or tiering when potential opportunities arise.

Some examples may include testing. Features may include:

Use of fuzzy testing at every layer for finding bugs.

Modularized system with the ability to use mocks or real implementations in any combination to enable efficient and accurate testing.

Examples specific to OneDrive may include:

General pattern covering OneDrive.

UI, fail-safe backups, SLA protection, cloud-agnostic backup.

Point-in-time restores.

Some examples include multiple app ingestion and flow control using multiple Azure AD apps for improving ingestion performance from Office365™ (o365) and a centralized flow-controller to coordinate throttling backoff and avoid being penalized.

Some examples include Exocompute, Auto-Scaling, Auto-Versioning, and central CR across many customers. Some container registries present a way of storing software that will be run as containers on platforms such as Docker and Kubernetes. The software is stored in a format known as a Docker image. Traditionally when running proprietary software, a private and isolated container registry is used to store the Docker images needed.

Instead, with Exocompute, examples include a runtime system and deployment system to support the use of a single, central Container Registry across any number of customers, each running slightly different versions of the software. By tagging the images with a name that uniquely identifies the software version, and then when running the software for each customer using this version identifier, examples can ensure that the correct version is run for any customer at any point in time and multiple versions of the same software can be run concurrently.

Figure 6:
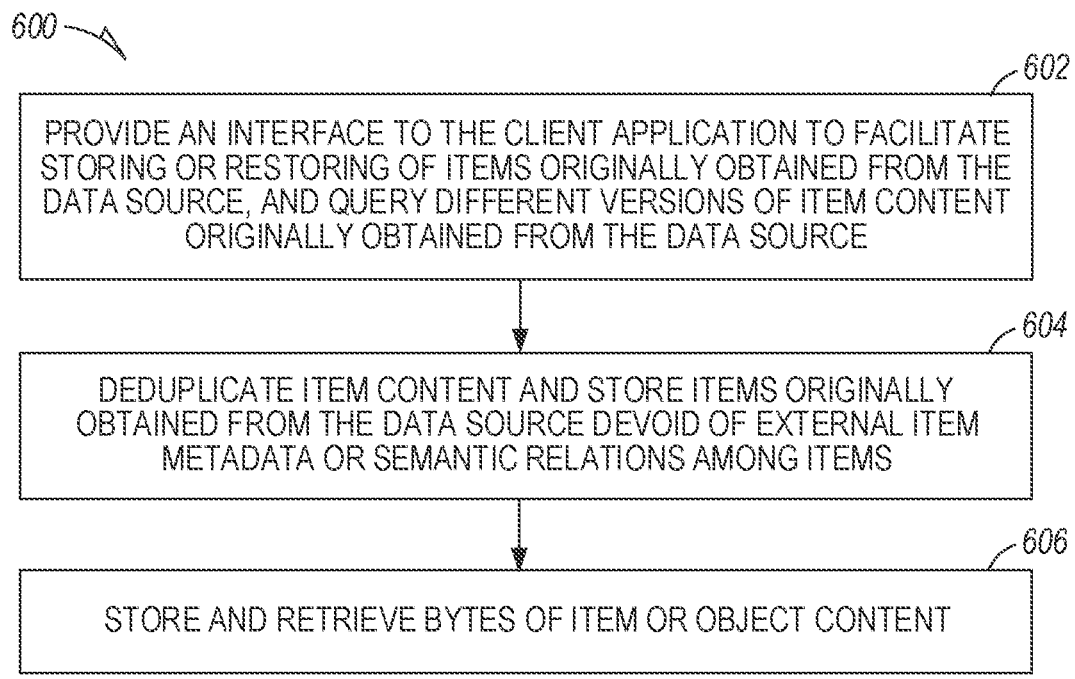
FIG. 6 is a flow chart depicting example operations in a method, according to one example.

Some examples of the present disclosure include methods. With reference to FIG. 6, example operations in a method 600 performed at a cloud object storage and versioning system (COSVS) are disclosed. In some examples, the method 600 may be used for coordinating insertion of metadata into a database and data into an object store in a compute infrastructure, the compute infrastructure including the database, the object store, a data source, and a client application interacting with the data source. In some examples, operations in the method 600 may comprise: at operation 602, providing a client API layer for the COSVS, the client API layer confined to provide an interface to the client application to facilitate storing or restoring of items originally obtained from the data source, and query different versions of item content originally obtained from the data source; at operation 604, providing a deduplication layer for the COSVS, the deduplication layer to deduplicate item content and store items originally obtained from the data source devoid of external item metadata or semantic relations among items; and, at operation 606, providing a packing layer for the COSVS, the packing layer to store and retrieve bytes of item or object content.

In some examples, the deduplication layer acts as a key-value store for the client API layer, and wherein the keys in the key-value store have no semantic meaning externally of the COSVS.

In some examples, each key of the keys includes a UUID.

In some examples, the packing layer provides an interface for the key-value store, and wherein the keys are constructed and assigned a meaning internally of the COSVS by a concatenation of content hashes from the deduplication layer.

In some examples, the packing layer stores bytes of item or object content in packs, the packs based on a threshold item or object size, wherein items or objects below the threshold size are packed together in a single pack, and wherein an item or object above a threshold size is assigned a single key-value pair.

In some examples, the method 600 further comprises providing an intent logger for the COSVS, the intent logger to provide rollback functionality in the event of a malware event or system crash of the compute infrastructure.

Some examples include a non-transitory machine-readable medium which, when read by a machine, cause the machine to perform operations in a method 600 as summarized above, or as described elsewhere herein.

Figure 3:
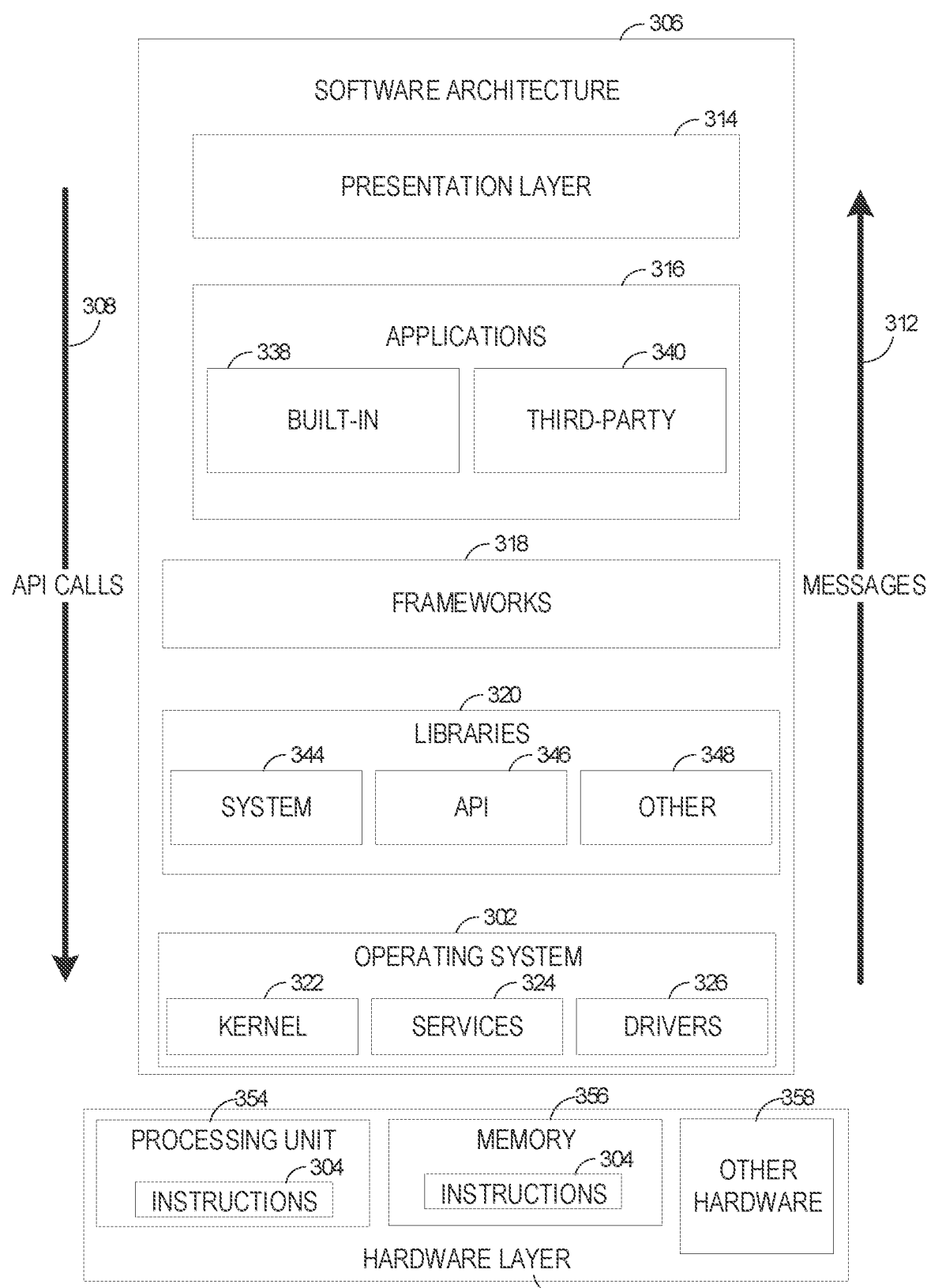
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture, and it will be appreciated that many other architectures may be implemented to facilitate the functionality described herein. The software architecture 306 may execute on hardware such as a machine 400 of FIG. 4 that includes, among other things, processors, memory, and I/O components. A representative hardware layer 352 is illustrated and can represent, for example, the machine 400 of FIG. 4. The representative hardware layer 352 includes a processing unit 354 having associated executable instructions 304. The executable instructions 304 represent the executable instructions of the software architecture 306, including implementation of the methods, components, and so forth described herein. The hardware layer 352 also includes a memory/storage 356, which also has the executable instructions 304. The hardware layer 352 may also comprise other hardware 358.

In the example architecture of FIG. 3, the software architecture 306 may be conceptualized as a stack of layers where each layer provides functionality. For example, the software architecture 306 may include layers such as an operating system 302, libraries 320, frameworks/middleware 318, applications 316, and a presentation layer 314. Operationally, the applications 316 and/or other components within the layers may invoke API calls 308 through the software stack and receive a response in the form of messages 312. The layers illustrated are representative in nature and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions, high-level resource management, high-level location services, and so forth. The frameworks/middleware 318 may provide a broad spectrum of other APIs that may be utilized by the applications 316 and/or other software components/modules, some of which may be specific to a particular operating system 302 or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Figure 4:
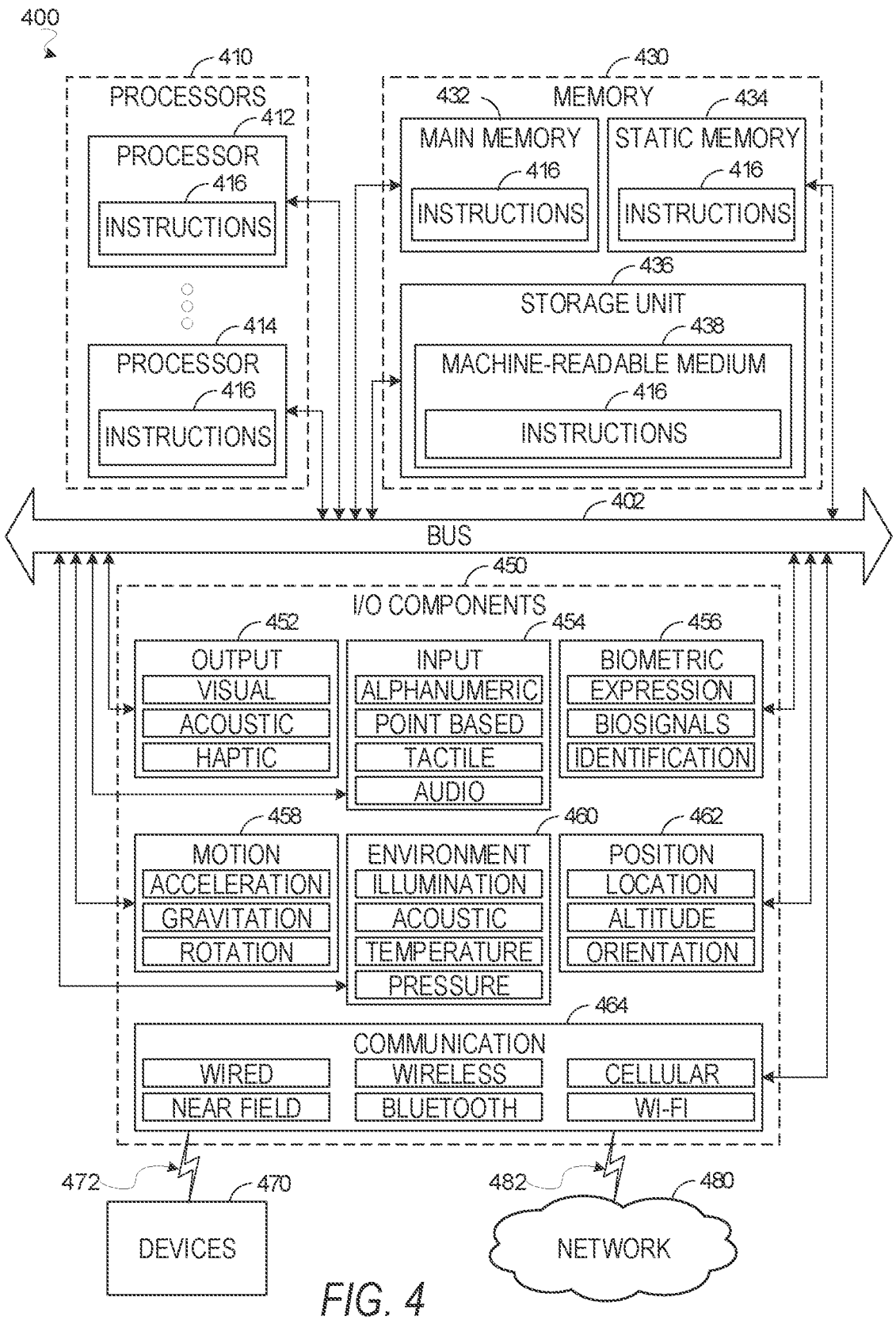
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. As such, the instructions 416 may be used to implement modules or components described herein. The instructions 416 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines that individually or jointly execute the instructions 416 to perform any one or more of the methodologies discussed herein.

The machine 400 may include processors 410, memory/storage 430, and I/O components 450, which may be configured to communicate with each other such as via a bus 402. The memory/storage 430 may include a main memory 432, static memory 434, and a storage unit 436, both accessible to the processors 410 such as via the bus 402. The storage unit 436 and main memory 432 store the instructions 416 embodying any one or more of the methodologies or functions described herein. The instructions 416 may also reside, completely or partially, within the static memory 434, within the storage unit 436 (e.g., on machine readable-medium 438), within at least one of the processors 410 (e.g., within the processor cache memory accessible to processors 412 or 414), or any suitable combination thereof, during execution thereof by the machine 400. Accordingly, the main memory 432, static memory 434, the storage unit 436, and the memory of the processors 410 are examples of machine-readable media.

The I/O components 450 may include a wide variety of components to receive input, provide output, produce output, transmit information, exchange information, capture measurements, and so on. The specific I/O components 450 that are included in a particular machine 400 will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion and the grouping is in no way limiting. In various example embodiments, the I/O components 450 may include output components 452 and input components 454. The output components 452 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 450 may include biometric components 456, motion components 458, environment components 460, or position components 462 among a wide array of other components. For example, the biometric components 456 may include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 458 may include acceleration sensor components (e.g., accelerometer), gravitation sensor components, rotation sensor components (e.g., gyroscope), and so forth. The environment components 460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), or other components that may provide indications, measurements, or signals corresponding to a surrounding physical environment. The position components 462 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 450 may include communication components 464 operable to couple the machine 400 to a network 480 or devices 470 via a coupling 482 and a coupling 472, respectively. For example, the communication components 464 may include a network interface component or other suitable device to interface with the network 480. In further examples, the communication components 464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., a peripheral device coupled via a USB).

Moreover, the communication components 464 may detect identifiers or include components operable to detect identifiers. For example, the communication components 464 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 464, such as location via Internet Protocol (IP) geolocation, location via Wi-Fi® signal triangulation, location via detecting an NFC beacon signal that may indicate a particular location, and so forth.

"CARRIER SIGNAL" in this context refers to any intangible medium that is capable of storing, encoding, or carrying instructions 416 for execution by the machine 400, and includes digital or analog communications signals or other intangible media to facilitate communication of such instructions 416. Instructions 416 may be transmitted or received over the network 480 using a transmission medium via a network interface device and using any one of a number of well-known transfer protocols.

"CLIENT DEVICE" in this context refers to any machine 400 that interfaces to a network 480 to obtain resources from one or more server systems or other client devices (e.g., client device). A client device may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 480.

"COMMUNICATIONS NETWORK" in this context refers to one or more portions of a network 480 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 480 may include a wireless or cellular network and the coupling 482 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, a device, or other tangible media able to store instructions 416 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 416. The term "machine-readable medium" shall also be taken to include any medium, or combination of multiple media, that is capable of storing instructions 416 (e.g., code) for execution by a machine 400, such that the instructions 416, when executed by one or more processors 410 of the machine 400, cause the machine 400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 412 or a group of processors 410) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 400) uniquely tailored to perform the configured functions and are no longer general-purpose processors 410.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 412 configured by software to become a special-purpose processor, the general-purpose processor 412 may be configured as respectively different special-purpose processors (e.g., comprising different hardware components) at different times. Software accordingly configures a particular processor 412 or processors 410, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices and can operate on a resource (e.g., a collection of information).

The various operations of example methods described herein may be performed, at least partially, by one or more processors 410 that are temporarily configured (e.g., by software) or permanently configured to perform the relevant operations. Whether temporarily or permanently configured, such processors 410 may constitute processor-implemented components that operate to perform one or more operations or functions described herein. As used herein, "processor-implemented component" refers to a hardware component implemented using one or more processors 410. Similarly, the methods described herein may be at least partially processor-implemented, with a particular processor 412 or processors 410 being an example of hardware. For example, at least some of the operations of a method may be performed by one or more processors 410 or processor-implemented components. Moreover, the one or more processors 410 may also operate to support performance of the relevant operations in a "cloud computing" environment or as a "software as a service" (SaaS). For example, at least some of the operations may be performed by a group of computers (as examples of machines 400 including processors 410), with these operations being accessible via a network 480 (e.g., the Internet) and via one or more appropriate interfaces (e.g., an API). The performance of certain of the operations may be distributed among the processors 410, not only residing within a single machine 400, but deployed across a number of machines 400. In some example embodiments, the processors 410 or processor-implemented components may be located in a single geographic location (e.g., within a home environment, an office environment, or a server farm). In other example embodiments, the processors 410 or processor-implemented components may be distributed across a number of geographic locations.

"PROCESSOR" in this context refers to any circuit or virtual circuit (a physical circuit emulated by logic executing on an actual processor 412) that manipulates data values according to control signals (e.g., "commands," "op codes," "machine code," etc.) and which produces corresponding output signals that are applied to operate a machine 400. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 410 may further be a multi-core processor 410 having two or more independent processors 412, 414 (sometimes referred to as "cores") that may execute instructions 416 contemporaneously.

"TIMESTAMP" in this context refers to a sequence of characters or encoded information identifying when a certain event occurred, for example giving date and time of day, sometimes accurate to a small fraction of a second.

Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A method, comprising:
    storing, by a client application programming interface (API) layer of a cloud computing system, for an item received at the client API layer, an item identifier that has a semantic meaning and metadata for the item;
    receiving, by a deduplication layer of the cloud computing system, the item from the client API layer;
    calculating, by the deduplication layer and based at least in part on receiving the item, a first plurality of hashes for a plurality of segments of the item;
    receiving, by a packing layer of the cloud computing system and from the deduplication layer, based at least in part on a comparison of the first plurality of hashes with a second plurality of hashes stored at the deduplication layer, one or more segments of the plurality of segments of the item;
    packing, by the packing layer, the one or more segments of the plurality of segments in a pack; and
    storing, by the packing layer of the cloud computing system, the pack in a key-value store, wherein a key associated with the pack in the key-value store is based at least in part on a concatenation of one or more hashes of the one or more segments and a unique identifier assigned to the key.

2. The method of claim 1, further comprising:
    packing, by the packing layer, the plurality of segments in the pack based at least in part on a threshold segment size, wherein first segments below the threshold segment size are packed together and second segments at or above the threshold segment size are packed alone, and wherein the packing layer stores the one or more segments based at least in part on the packing.

3. The method of claim 1, wherein:
    packing the one or more segments into the pack comprises:
        inserting, into the key-value store, metadata for each segment of the one or more segments,
        inserting the metadata into an in-memory index,
        appending content of the one or more segments to the key-value store, and
        adding, into the pack, a bitmap that tracks whether any of the one or more segments have been deleted from the pack, and
    the one or more segments are stored in the key-value store based at least in part on the packing.

4. The method of claim 1, further comprising:
    providing, by the cloud computing system, a rollback functionality based at least in part on a malware event, a system crash of a compute infrastructure coupled with the cloud computing system, a crash of an application running at the compute infrastructure, or an abort signal.

5. The method of claim 4, further comprising:
    recording, by the cloud computing system, an intent for each operation submitted to the client API layer.

6. The method of claim 1, wherein the plurality of segments is stored in the key-value store devoid of external metadata, semantic relations, or both.

7. The method of claim 1, wherein the key in the key-value store is assigned a meaning within the cloud computing system.

8. The method of claim 7, wherein the key in the key-value store has no semantic meaning outside the cloud computing system.

9. The method of claim 1, further comprising:
    receiving, by the client API layer, data from a data source, the data comprising a plurality of items that includes the item.

10. The method of claim 9, further comprising:
    restoring, by the client API layer, based at least in part on the one or more segments stored in the key-value store, the item to the data source.

11. The method of claim 9, further comprising:
    querying, by the client API layer, based at least in part on the one or more segments stored in the key-value store, different versions of the item.

12. The method of claim 9, wherein the cloud computing system is a cloud object storage and versioning system.

13. An apparatus, comprising:
    one or more processors; and
    one or more memories storing code comprising instructions executable, individually or collectively, by the one or more processors to cause the apparatus to:
        store, by a client application programming interface (API) layer of a cloud computing system, for an item received at the client API layer, an item identifier that has a semantic meaning and metadata for the item;
        receive, by a deduplication layer of the cloud computing system, the item from the client API layer;
        calculate, by the deduplication layer and based at least in part on receiving the item, a first plurality of hashes for a plurality of segments of the item;
        receive, by a packing layer of the cloud computing system and from the deduplication layer, based at least in part on a comparison of the first plurality of hashes with a second plurality of hashes stored at the deduplication layer, one or more segments of the plurality of segments of the item;
        pack, by the packing layer, the one or more segments of the plurality of segments in a pack; and
        store, by the packing layer of the cloud computing system, the pack in a key-value store, wherein a key associated with the pack in the key-value store is based at least in part on a concatenation of one or more hashes of the one or more segments and a unique identifier assigned to the key.

14. The apparatus of claim 13, wherein the instructions are further executable, individually or collectively, by the one or more processors to cause the apparatus to:
    pack, by the packing layer, the plurality of segments in the pack based at least in part on a threshold segment size, wherein first segments below the threshold segment size are packed together and second segments at or above the threshold segment size are packed alone, and wherein the packing layer stores the one or more segments based at least in part on the packing.

15. The apparatus of claim 13, wherein the instructions are further executable, individually or collectively, by the one or more processors to cause the apparatus to:

provide, by an intent logger of the cloud computing system, a rollback functionality based at least in part on a malware event, a system crash of a compute infrastructure coupled with the cloud computing system, a crash of an application running at the compute infrastructure, or an abort signal.

16. The apparatus of claim 13, wherein the key in the key-value store is assigned a meaning within the cloud computing system and has no semantic meaning outside of the cloud computing system.

17. A non-transitory, computer-readable medium storing code comprising instructions executable, individually or collectively, by one or more processors to:
   store, by a client application programming interface (API) layer of a cloud computing system, for an item received at the client API layer, an item identifier that has a semantic meaning and metadata for the item;
   receive, by a deduplication layer of the cloud computing system, the item from the client API layer;
   calculate, by the deduplication layer and based at least in part on receiving the item, a first plurality of hashes for a plurality of segments of the item;
   receive, by a packing layer of the cloud computing system and from the deduplication layer, based at least in part on a comparison of the first plurality of hashes with a second plurality of hashes stored at the deduplication layer, one or more segments of the plurality of segments of the item;
   pack, by the packing layer, the one or more segments of the plurality of segments in a pack; and
   store, by the packing layer of the cloud computing system, the pack in a key-value store, wherein a key in the key-value store is based at least in part on a concatenation of one or more hashes of the one or more segments and a unique identifier assigned to the key.

18. The non-transitory, computer-readable medium of claim 17, wherein the one or more processors are further executable, individually or collectively, by the one or more processors to:
   pack, by the packing layer, the plurality of segments in the pack based at least in part on a threshold segment size, wherein first segments below the threshold segment size are packed together and second segments at or above the threshold segment size are packed alone, and wherein the packing layer stores the one or more segments based at least in part on the packing.

* * * * *